US012760784B2

(12) United States Patent
Rossberger

(10) Patent No.: US 12,760,784 B2
(45) Date of Patent: Oct. 13, 2026

(54) TRACTION MECHANISM WITH INTERNAL TOOTHING AND EXTERNAL TOOTHING, AND TRANSMISSION WITH TRACTION MECHANISM

(71) Applicant: TQ-Systems GmbH, Seefeld (DE)

(72) Inventor: Antonius Georg Rossberger, Seefeld (DE)

(73) Assignee: TQ-Systems GmbH, Seefeld (DE)

( * ) Notice: Subject to any disclaimer, the term of this patent is extended or adjusted under 35 U.S.C. 154(b) by 0 days.

(21) Appl. No.: 18/898,210

(22) Filed: Sep. 26, 2024

(65) Prior Publication Data

US 2025/0043844 A1 Feb. 6, 2025

Related U.S. Application Data

(63) Continuation of application No. 17/057,307, filed as application No. PCT/IB2019/054085 on May 17, 2019, now Pat. No. 12,117,065.

(30) Foreign Application Priority Data

May 31, 2018 (WO) .................. PCT/IB2018/053897

(51) Int. Cl.
*F16G 1/28* (2006.01)
*B62M 9/00* (2006.01)
*F16H 49/00* (2006.01)

(52) U.S. Cl.
CPC ............. *F16G 1/28* (2013.01); *F16H 49/001* (2013.01); *B62M 9/00* (2013.01); *F16H 2049/003* (2013.01)

(58) Field of Classification Search
CPC .... F16G 1/28; F16H 49/001; F16H 2049/003; B62M 9/00
See application file for complete search history.

(56) References Cited

U.S. PATENT DOCUMENTS 541,713 A 6/1895 Bolton
3,052,138 A 9/1962 Louton, Jr. et al.
(Continued)

FOREIGN PATENT DOCUMENTS

CN 101813183 8/2010
CN 105074272 A 11/2015
(Continued)

OTHER PUBLICATIONS

Rossberger, Antonius Georg; International Search Report and Written Opinion for PCT/IB2019/054085, filed May 17, 2019, mailed Sep. 25, 2019, 53 pgs.

(Continued)

*Primary Examiner* — Terence Boes
(74) *Attorney, Agent, or Firm* — Smith, Gambrell & Russell, LLP

(57) ABSTRACT

A toothed belt includes an internal toothing and an external toothing; wherein tooth crests of the internal toothing comprise a rounded region and wherein tooth crests of the external toothing comprise a rounded region, wherein the tooth crests of the internal toothing are arranged radially opposite the tooth bases of the external toothing so that the toothed belt comprises an offset gap arrangement in which the teeth of the internal toothing and the external toothing are offset from each other, and wherein the toothed belt comprises a smooth central bearing region.

15 Claims, 18 Drawing Sheets

(56) References Cited

U.S. PATENT DOCUMENTS

| | | | | | |
|---|---|---|---|---|---|
| 4,072,062 | A * | 2/1978 | Morling | A01D 45/023 | 198/604 |
| 4,537,094 | A | 8/1985 | Bursa et al. | | |
| 4,542,664 | A | 9/1985 | Sladek et al. | | |
| 4,553,451 | A | 11/1985 | Distin, Jr. et al. | | |
| 4,554,846 | A | 11/1985 | Distin, Jr. et al. | | |
| 4,838,741 | A | 6/1989 | Dumoulin | | |
| 5,437,580 | A * | 8/1995 | Doring | F16H 7/023 | 156/138 |
| 11,162,574 | B2 | 11/2021 | Saito et al. | | |
| 12,117,065 | B2 | 10/2024 | Rossberger | | |
| 12,498,031 | B2 | 12/2025 | Hoebel et al. | | |
| 2017/0175872 | A1 | 6/2017 | Altamura et al. | | |
| 2021/0332869 | A1 | 10/2021 | Rossberger | | |
| 2026/0098575 | A1 | 4/2026 | Hoebel et al. | | |

FOREIGN PATENT DOCUMENTS

| | | | |
|---|---|---|---|
| CN | 105276094 | | 1/2016 |
| CN | 105650215 | | 6/2016 |
| CN | 206086855 | U | 4/2017 |
| DE | 3738521 | C1 | 11/1990 |
| DE | 4111661 | A1 | 10/1992 |
| DE | 102014115043 | A1 | 4/2016 |
| DE | 102016122845 | A1 | 3/2022 |
| EP | 2128494 | | 12/2009 |
| EP | 2625441 | A2 | 8/2013 |
| EP | 2672147 | A2 | 12/2013 |
| JP | H01206137 | A | 8/1989 |
| JP | 2005036937 | A | 2/2005 |
| JP | 2016065579 | A | 4/2016 |
| JP | 2020-1633 | A | 1/2020 |
| JP | 2021-25645 | A | 2/2021 |
| KR | 20100070607 | A | 6/2010 |
| WO | 2006119033 | A2 | 11/2006 |
| WO | 2010004449 | | 1/2010 |

OTHER PUBLICATIONS

Rossberger, Antonius Georg; International Preliminary Report on Patentability for PCT/IB2019/054085, filed May 17, 2019, mailed Dec. 1, 2020, 45 pgs.
TQ Systems, Inc; Office Action for Chinese patent application No. 201980036472.3, mailed Nov. 3, 2021, 18 pgs.
TQ-Systems GmbH; Office Action for Chinese patent application No. 201980036472.3, mailed Jun. 6, 2022, 6 pgs.
TQ-Systems GMBH; Summons to Attend Oral Proceedings for European patent application No. 19735628.0, mailed Oct. 12, 2022, 18 pgs.
TQ Systems GMBH; Office Action for Japanese patent application No. 2020-566746, mailed May 9, 2023, 6 pgs.
Rossberger, Antonius Georg; Non-Final Office Action for U.S. Appl. No. 17/057,307, filed Nov. 20, 2020, mailed Aug. 22, 2023, 76 pgs.
TQ-Systems; Third Party Submission for Japanese application No. 2020-566746, filed Oct. 10, 2023, 103 pgs.
TQ-Systems; Office Action for Japanese patent application No. 2020-566746, mailed Nov. 14, 2023, 4 pgs.
Rossberger, Antonius Georg; Notice of Allowance for U.S. Appl. No. 17/057,307, filed Nov. 20, 2020, mailed Mar. 6, 2024, 37 pgs.
Rossberger, Antonius Georg; Notice of Allowance for U.S. Appl. No. 17/057,307, filed Nov. 20, 2020, mailed May 29, 2024, 12 pgs.
Rossberger, Antonius Georg, Notification of Refusal for Japanese Patent Application No. 2024-092884, filed Jun. 7, 2024, mailed Jun. 4, 2025, 8 pgs.
TQ-Systems GMBH; Office Action for European Patent Application No. 23179082.5, mailed Apr. 2, 2025, 14 pgs.
Rossberger, Antonius Georg; Non-Final Office Action for U.S. Appl. No. 18/241,325, filed Sep. 1, 2023, mailed Mar. 17, 2026, 83 pgs.
TQ-Systems GMBH; Office Action for European application No. 20230193087.6, filed Nov. 28, 2017, mailed Mar. 19, 2026, 10 pgs.
Hornung, Heinz; Restriction Requirement for U.S. Appl. No. 18/692,262, filed Mar. 14, 2024, mailed Apr. 16, 2026, 9 pgs.
TQ-Systems GMBH; Search Report for Chinese patent application No. 202211548023.7, mailed Jan. 29, 2026, 4 pgs.
TQ-Systems GMBH; Office Action for Chinese patent application No. 202211548023.7, mailed Jan. 29, 2026, 7 pgs.
TQ-Systems GMBH; Summons to Oral Proceedings for European Patent Application No. 23179082.5, mailed Mar. 19, 2026, 18 pgs.
Rossberger, Antonius; Final Office Action for U.S. Appl. No. 18/739,084, filed Jun. 10, 2024, mailed Apr. 2, 2026, 11 pgs.
TQ Systems GMBH; European Search Report for Application No. 24175000, filed Mar. 20, 2014, mailed on Mar. 12, 2026, 22 pgs.
TQ-Systems GMBH, Office Action for European Patent Application No. 22790026.3, mailed Jun. 18, 2026, 9 pgs.
TQ-Systems GMBH, Office Action for Japanese Patent Application No. 2024-517085, mailed Jun. 18, 2026, 8 pgs.
Rossberger, Antonius Georg; Notice of Allowance for U.S. Appl. No. 18/739,084, filed Jun. 10, 2024, mailed Jul. 13, 2026, 11 pgs.
Hornung, Heinz; Non-Final Office Action for U.S. Appl. No. 18/692,262, filed Mar. 14, 2024, mailed Jul. 21, 2026, 76 pgs.
TQ-Systems GMBH; Office Action for Chinese patent application No. 202211548023.7, mailed Jul. 31, 2026, 11 pgs.

* cited by examiner

TRACTION MECHANISM WITH INTERNAL TOOTHING AND EXTERNAL TOOTHING, AND TRANSMISSION WITH TRACTION MECHANISM

REFERENCE TO RELATED APPLICATIONS

This application is a continuation of U.S. application Ser. No. 17/057,307, filed Nov. 20, 2020, which is a national stage entry of PCT Application No. PCT/IB2019/054085, filed May 17, 2019, which claims foreign priority to PCT Application No. PCT/IB2018/053897, filed May 31, 2018, each of which is hereby specifically incorporated by reference herein in its entirety.

ADDITIONAL INCORPORATION BY REFERENCE

The subject matter of the patent application PCT/IB2017/057452 is hereby incorporated by reference into the present specification, in particular with reference to FIGS. 1-9 and the corresponding text on page 28, line 11 to page 34, line 14 of the specification, which relate to a harmonic pin ring transmission,

- FIG. 10, which relates to a mounting concept for the transmission of FIGS. 1-9,
- FIGS. 11-14 and 20 and the corresponding text on pages 36, line 14 to page 40, line 21 and page 41, line to page 42, line 30 of the specification, which relate to a harmonic pin ring transmission with an eccentric disk, FIGS. 15-19 and the corresponding text on page 40, line 32 to page 41, line 35, which relate to a pin ring for the transmission of FIGS. 11-14,
- FIGS. 21-29 and the corresponding text on page 48, line 8 to page 50, line 24, FIGS. 30, 31 and the corresponding text on page 50, line 62 to page 53, line 10, which relate to a load cell,
- FIGS. 43 and 44, which refer to an HPD transmission with a load cell, and the corresponding text on page 57, line 36 to page 58, line 38, FIGS. 32 and 34, and the corresponding text on page 55, line 8 to page 56, line 9, which relate to a fastening and mounting concept for the load cell,
- FIGS. 35-40 and the corresponding text on page 56, line 11 to page 57, line 35, as well as FIGS. 41 and 42 and the corresponding text on page 57, lines 30-35, which relate to an indirect measurement of a pedal shaft torque with strain gauges,
- FIGS. 45-59 and the corresponding text on page 59, line 1 to page 63, line 26, which relate to a freewheel assembly and FIG. 60 and the corresponding text on page 63, lines 28-34, which relate to a harmonic pin ring transmission with a clamp roller freewheel,
- FIGS. 61-66 and the corresponding text on page 64, line 1 to page 67, line 27, which relate to a geared motor,
- FIGS. 67-76 and the corresponding text on page 67, line 29 to page 69, line 31, which relate to a harmonic pin ring transmission with a planetary gear as a crank gear,
- FIGS. 77-81, and the corresponding text on page 69, line 33 to page 73, line 21, which relate to a cycloidal gear,
- FIGS. 82-88, and the corresponding text on page 73, line 23 to page 75, line 16, which relate to a tension shaft transmission,
- FIGS. 89-93 and the corresponding text on page 76, line 23 to page 78, line 24, which relate to a two-part pin ring and a high-reduction gear with the two-part pin ring,
- FIGS. 94-118, and the corresponding text on page 78, line 26 to page 105, line 4, which relate to toothing geometries and in particular a one-epicycle geometry and a two-epicycle geometry, the generic FIGS. 119-123 and the corresponding text on page 105, line 34 to page 107, line 12, which relate to the transmissions of the present specification, FIGS. 124-126 and the corresponding text on page 107, line 14 to page 107, line 21, which, like the above-mentioned FIGS. 82-88, relate to a tension shaft transmission, as well as the further text of the specification of PCT/IB2017/057452 which relates to the above-mentioned exemplary embodiments.

The following terms in this specification correspond to the terms listed below in the specification of PCT/IB2017/057452.

A central bearing region on the inside of a toothed belt corresponds to the "inner bearing surface" of a pin ring, in particular a one-piece pin ring, and a central bearing region on the outside of a toothed belt corresponds to an "outer bearing surface" of a pin ring, in particular a one-piece pin ring.

A "rotor transmitter unit" corresponds to an inner rotor shaft 27 and a cam disk 28 or an inner rotor shaft 27 and an eccentric disk 28', an "inner gear driven shaft unit" corresponds to an inner gear 7 with a hollow shaft portion 234. An "outer gear assembly" corresponds to a support ring 36 with a first outer gear 8 attached to it or inserted therein and a second outer gear 8' attached to it or inserted therein.

A "one-epicycle toothing" corresponds to a toothing based on a gear trajectory with one epicycle, as is also defined, for example, in item 1 of the first listing at the end of the present specification. A "two-epicycle toothing" corresponds to a toothing based on an epicycle gear trajectory with two epicycles, as is also defined, for example, in items 12 or 13 of the first listing at the end of the present specification.

SUMMARY

The present specification discloses a toothed belt with an internal toothing and an external toothing, tooth crests of the internal toothing comprising a rounded region with a cross section in the shape of a segment of a circle. Tooth crests of the external toothing comprise a rounded region with a cross section in the shape of a segment of a circle. A region between two adjacent tooth crests of the internal toothing is at least as wide as a tooth width of teeth of the internal toothing, and a region between two adjacent tooth crests of the external toothing is at least as wide as a tooth width of teeth of the external toothing.

In particular, the region between the tooth crests may be at least as wide as a width of the tooth crests of the respective toothing plus a width which is determined by the shape of a toothing of an outer gear or an inner gear of a transmission that matches the respective toothing of the toothed ring.

In particular, tooth crests of the internal toothing may be arranged radially opposite the tooth crests of the external toothing according to a symmetrical arrangement. Alternatively, tooth crests of the internal toothing may be arranged in an offset arrangement radially opposite the tooth bases of the external toothing.

Furthermore, tooth bases of the internal toothing may be shaped as flat tooth bases which correspond to a section of a vertical circular cylinder. This shape allows simple production, for example by molding from a cylindrical workpiece and is sufficient to achieve good to very good engagement of the toothed belt with a suitably designed counter-toothing of an inner or an outer gear that engages in the toothed belt.

According to a further embodiment, the toothed belt has the shape of a corrugated sheet in the form of a vertical circular cylinder, which has a constant thickness, wherein the internal toothing is formed by a rear side of the external toothing, and wherein the external toothing is formed by a rear side of the internal toothing.

According to a further embodiment, an inner side of the toothed belt comprises a smooth central bearing region which is provided in the form of a vertical circular cylinder, such that the internal toothing adjoins the central bearing region in axially opposite regions. Here, smooth means compared to a scale that can be observed without aids and not on a microscopic scale.

Furthermore, an outside of the toothed belt may comprise a central bearing region which is provided in the form of a vertical circular cylinder, such that the external toothing adjoins the central bearing region in axially opposite regions.

In particular, the toothed belt may be made in one piece, for example cast, milled, or punched, which allows efficient manufacture and good stability.

According to an embodiment, the toothed belt comprises plastic, wherein it may comprise more than 90 percent by weight of plastic or it may also be made entirely of plastic.

According to a further embodiment, the toothed belt comprises a steel alloy, wherein it may in particular comprise more than 90 percent by weight of steel alloy or it may also be made entirely from a steel alloy.

In particular, the toothed belt may comprise a steel-cobalt-manganese alloy, may comprise more than 90 percent by weight of a steel-cobalt-manganese alloy, or it may be made entirely from a steel-cobalt-manganese alloy.

Furthermore, the present specification discloses a transmission with an input shaft and with an output shaft, with an outer gear and an inner gear arranged concentrically to the outer gear inside the outer gear, and with a traction mechanism extending between the outer gear and the inner gear.

The transmission comprises at least one revolving transmitter which lifts the traction mechanism from the outer circumference of the inner gear and presses it against the inner circumference of the outer gear. The traction mechanism is provided as the toothed belt according to the specification above.

In the transmission, the input shaft may in particular be connected to the transmitter, to the outer gear or to the inner gear, and the output shaft may be connected to the transmitter, to the outer gear or to the inner gear, provided the input shaft is not already connected to them.

Furthermore, the present specification discloses a transmission according to one of the items 1, 15, 34, 37, 46, 52, 57 or 59 of the second listing of the present specification, wherein the traction mechanism is provided as the above-mentioned toothed belt.

Furthermore, the present specification discloses a harmonic pin ring transmission according to item 1 of the first listing of the present specification, wherein the pin ring is provided as the above-mentioned toothed belt.

Furthermore, the present specification discloses a harmonic pin ring transmission according to item 14 of the first listing of the present specification, wherein the pin ring is provided as the above-mentioned toothed belt.

In particular, an electric motor may be provided whose rotor is connected to the input shaft of the transmission. Alternatively, an internal combustion engine may also be provided, wherein an output shaft of the internal combustion engine is connected to the input shaft of the transmission.

Furthermore, the present specification discloses a vehicle, in particular a two-wheeler or three-wheeler, with the above-mentioned motor-transmission unit, wherein at least one running wheel of the vehicle is connected to the output shaft of the transmission.

Furthermore, the present specification discloses a power generator with a drive unit, with a generator unit for generating power and with an above-mentioned transmission, wherein an input shaft of the transmission is connected to the drive unit and wherein an output shaft of the transmission is connected to an input shaft of the generator.

BRIEF DESCRIPTION OF THE DRAWINGS

The subject matter of the present specification is described below with reference to the following figures.

DETAILED DESCRIPTION

In the following, details are provided to illustrate the embodiments of the present specification. However, it should be apparent to those skilled in the art that the embodiments can be practiced without such details.

Figure 1:
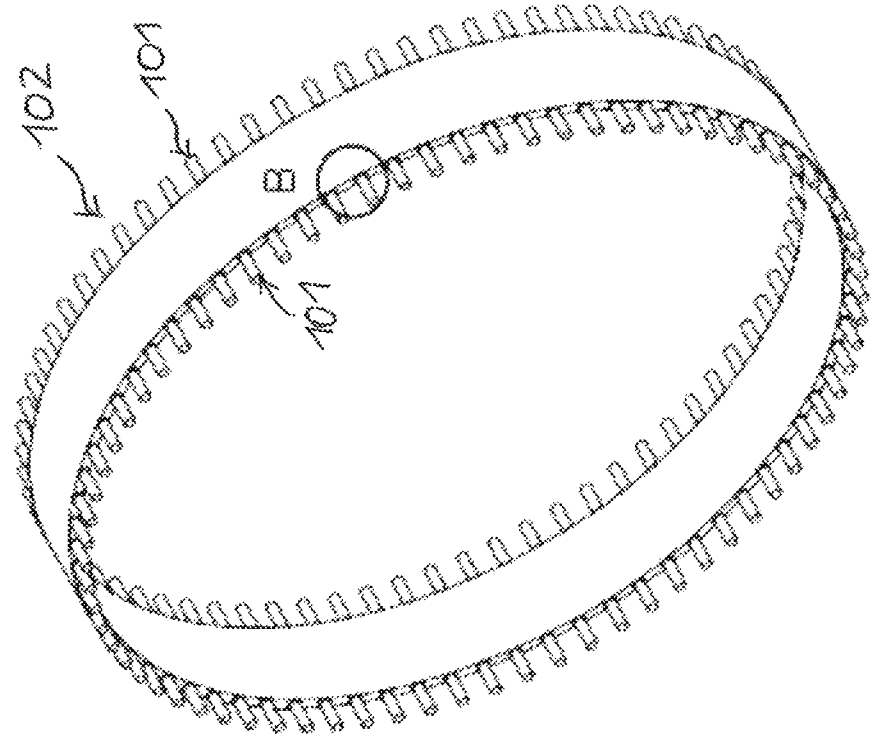
FIG. 1 shows a perspective view of a first embodiment of a pin ring with a gap arrangement of the pins.

FIG. 1 shows a perspective view of a first embodiment of a pin ring 201 with a gap arrangement of the pins 101. In a gap arrangement of pins or teeth, a gap is arranged between two pins or teeth, which is at least as wide as a width of the pins or teeth. For example, the extension of a tooth in the circumferential direction halfway between the tooth base and the tooth crest can be regarded as the tooth width. According to an alternative definition, the tooth width corresponds to the width at the height of a pitch circle.

When the pin ring with the gap arrangement is mounted in a transmission, then a pin or a tooth of a traction mechanism alternately engages in a tooth base of the respective external or internal toothing of the transmission, and an adjacent tooth base in the circumferential direction is without engagement. This applies to an engagement region in which the pins are in engagement with the respective internal or external toothing.

Figure 18:
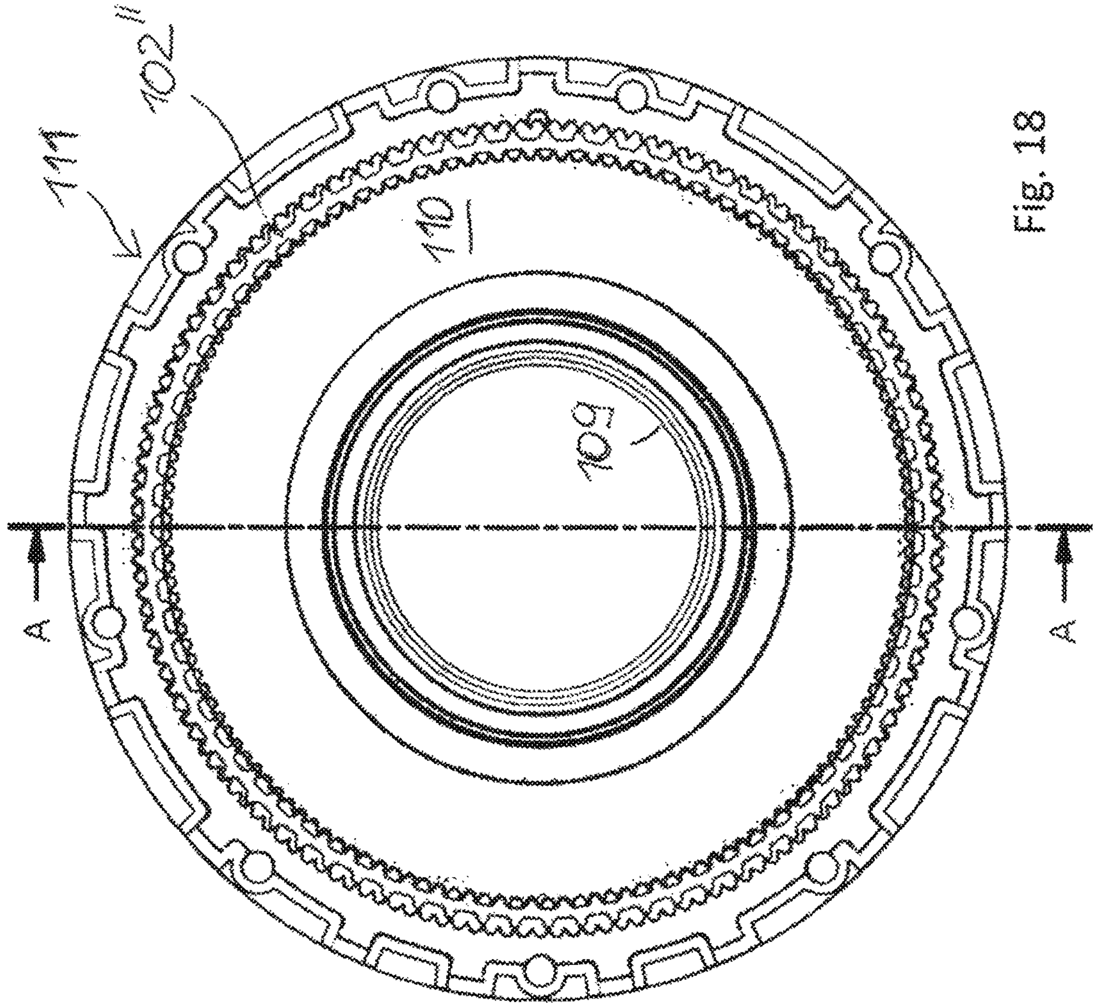
FIG. 18 shows a driven side frontal view of a harmonic pin ring transmission.

Preferably, the toothings and/or the pins are configured such that all pins or teeth of a traction mechanism are in contact or engagement with an opposing tooth of the respective internal or external toothing, so that the engagement region extends over the entire circumference or over 360 degrees as shown in FIG. 18. In the broader sense, engagement is also referred to when two opposing tooth crests bear on top of each other, as is shown in the middle of FIG. 18 for the external toothing.

This engagement with gaps is shown in FIG. 18. The engagement with gaps for the external toothing can be seen particularly well in the upper and lower area of FIG. 18 for the external toothing and can be seen particularly well for the internal toothing in the middle area of FIG. 18.

Figure 2:
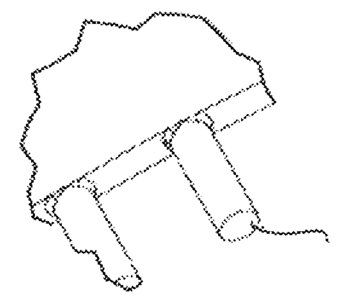
FIG. 2 shows an enlarged detail of the pin ring of FIG. 1.

FIG. 2 shows an enlarged detail of the pin ring 102 of FIG. 1, in which a transition region between the pins 101 and a central bearing ring is shown. According to the embodiment of FIGS. 1-5, the pin ring is made in one piece. For example, the laterally protruding pins may be milled or punched out of a workpiece.

A suitable material for the pin ring 102 of FIG. 1 and for the other pin rings or toothed belts disclosed in the present specification is, for example, a steel alloy which is characterized by good punchability and formability. In particular, it may be a manganese-chromium steel alloy such as 16MnCr5, material number 1.7131.

Figure 3:
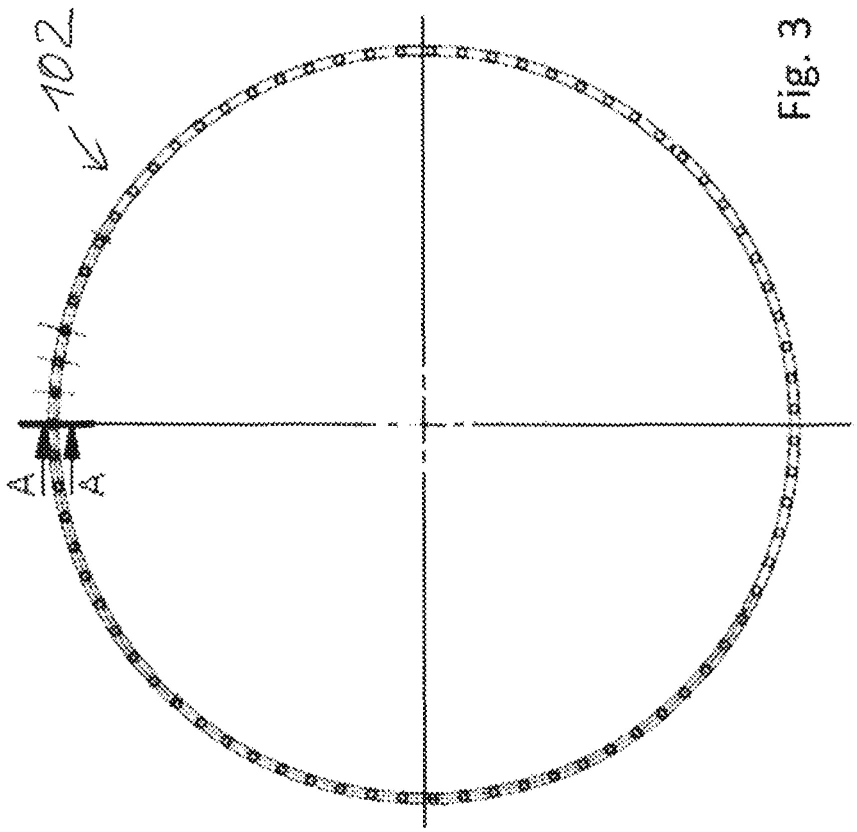
FIG. 3 shows a side view of the pin ring of FIG. 1.

FIG. 3 shows a side view of the pin ring 102 of FIG. 1, in which an angular distance between the pins is depicted. This angular distance depends on a radius of the pin ring and on a number of the pins evenly distributed over the circumference and is 4.8 degrees in the example of FIG. 3.

Figure 4:
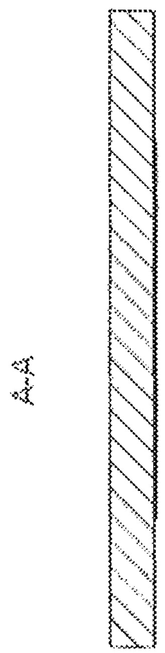
FIG. 4 shows a cross section of the pin ring along the cross-sectional line A-A of FIG. 3.

FIG. 4 shows a cross section of the pin ring 102 along the section line A-A of FIG. 3. As can be seen in FIG. 4, a diameter of the pins is approximately as large as a thickness of the central bearing ring.

Figure 5:
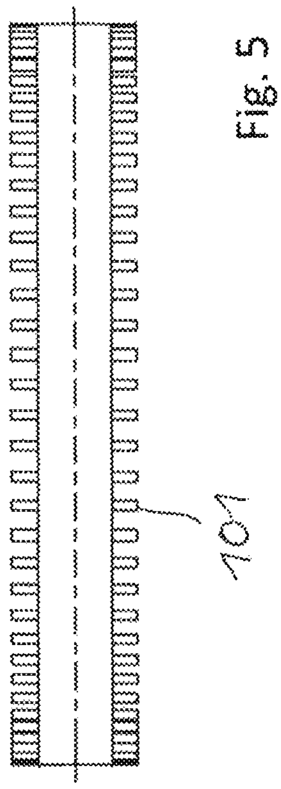
FIG. 5 shows a front view of the pin ring of FIG. 1.

FIG. 5 shows a front view of the pin ring 102 of FIG. 1, in which the central bearing ring and the pins that protrude to the right and left of the central bearing ring in the axial direction are shown.

Figure 6:
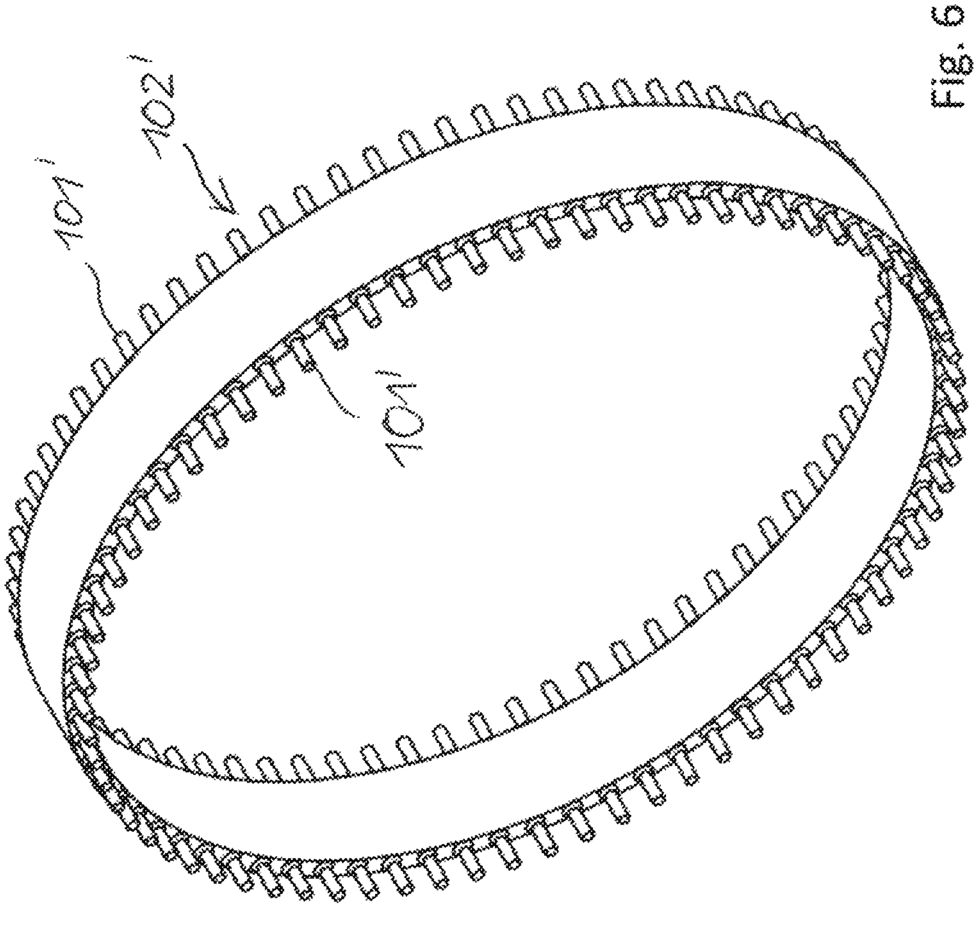
FIG. 6 shows a perspective view of a second embodiment of a pin ring with a gap arrangement of the pins.

FIG. 6 shows a perspective view of a second embodiment of a pin ring 102' with a gap arrangement of the pins 101'. This embodiment differs from the embodiment of FIG. 1 in that the diameter of the pins is less than a thickness of the central bearing ring.

Figure 7:
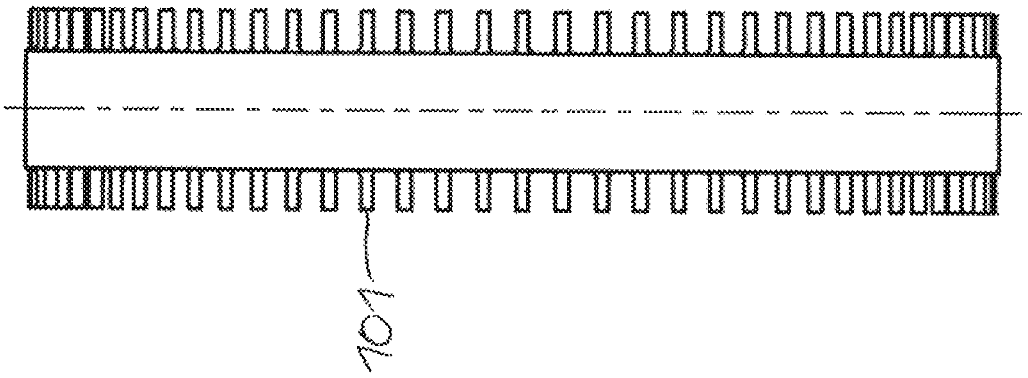
FIG. 7 shows a front view of the pin ring of FIG. 6.

FIG. 7 shows a front view of the pin ring 102' of FIG. 6.

Figure 8:
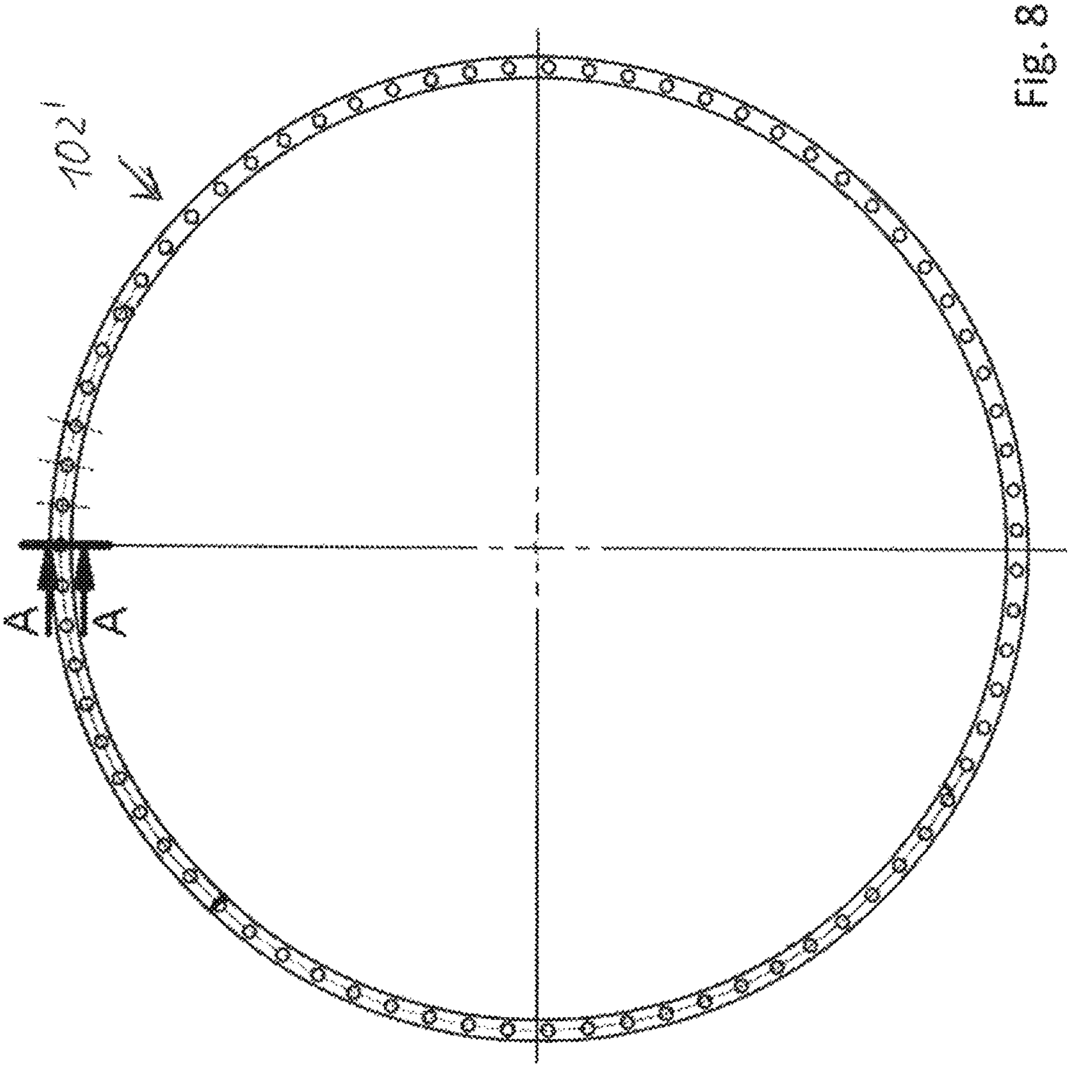
FIG. 8 shows a side view of the pin ring of FIG. 6.

FIG. 8 shows a side view of the pin ring 102' of FIG. 6.

Figure 9:
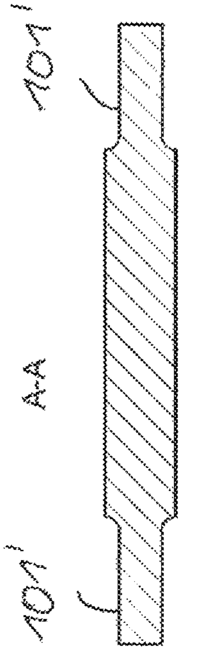
FIG. 9 shows a cross-sectional view of the pin ring of FIG. 6 along the section line A-A of FIG. 8.

FIG. 9 shows a cross-sectional view of the pin ring 102' of FIG. 6 along the section line A-A of FIG. 8. The pin ring 102' is manufactured in such a way that the diameter of the workpiece tapers outward in the axial direction in a transition region to a diameter of the pins which is here approximately two thirds the thickness of the central bearing ring.

FIGS. 10-13, 15 and 17 show pin rings which are configured in the manner of a toothed belt and comprise an external toothing and an internal toothing, wherein the number of teeth of the external toothing corresponds to the number of teeth of the internal toothing. The teeth may also be viewed as pins and the pin rings of FIGS. 10-13, 15 and 17 are also referred to as double pin rings or double toothed rings.

The pin rings of FIGS. 10-17 can be made of an elastic material and/or suitably dimensioned so that they are suitable in particular for an oval or ellipsoidal deformation, wherein the location of the deformation rotates on a circular path by a rotating transmitter arranged radially inside the respective pin ring.

The pin rings of FIGS. 10-17 can also be made of an inelastic or less elastic material and/or dimensioned accordingly so that they are suitable for being guided on a circular path by an eccentrically arranged cylindrical cam disk of a transmitter.

In particular, the cross-section of the teeth may resemble a cross-section of half of a pin, that is to say be approximately semicircular or, apart from a transition region, be in the shape of a segment of a circle. At least the upper region of the tooth crests is preferably rounded in the shape of a segment of a circle.

This upper region rounded in the shape of a segment of a circle may extend, for example, as seen from the tooth crest, over at least 30% or at least 40% of a tooth height measured from the center between tooth base and tooth crest, whereby on the one hand a larger transition region between tooth crest and tooth base can be made available and on the other hand the tooth shape is still sufficiently similar to a pin shape.

The transition region can provide elasticity and there is a freedom of design to adapt the dimensioning of the tooth geometry of the toothed belt to an external toothing of an inner gear or to an internal toothing of an outer gear.

According to other exemplary embodiments, the upper region rounded in the shape of a segment of a circle may extend, as seen from the tooth crest, over at least 70%, at least 80% or at least 90% of a tooth height measured from the center between tooth base and tooth crest, as a result of which the best possible resemblance to a pin shape is achieved. The similarity of the tooth shape to the pin shape enables, for example, the best possible engagement with the one-epicycle toothing disclosed in PCT/IB2017/057452 or the two-epicycle toothing also disclosed therein of an outer gear and/or an inner gear.

According to other exemplary embodiments, the upper region rounded in the shape of a segment of a circle may extend, as seen from the tooth crest, over at least 50%, at least 60% of a tooth height measured from the center between the tooth base and the tooth crest, thereby achieving a compromise between a pin-like tooth shape and a sufficiently wide transition region.

The tooth base of the internal toothing and the external toothing, on the other hand, may be made flat, that is to say form a section of a cylinder, as shown, for example, in FIGS. 10-13.

In particular, the tooth shape of the internal toothing can match or be structurally identical to the tooth shape of the external toothing. The tooth shape of the internal and external toothing preferably corresponds to a straight tooth shape or a tooth shape of a spur gear, which can be easily produced, for example, by milling. A helical toothing not shown in the figures is also possible.

The double toothed rings may, among other things, comprise a one-epicycle toothing or a two-epicycle toothing, as described in PCT/IB2017/057452.

Figure 10:
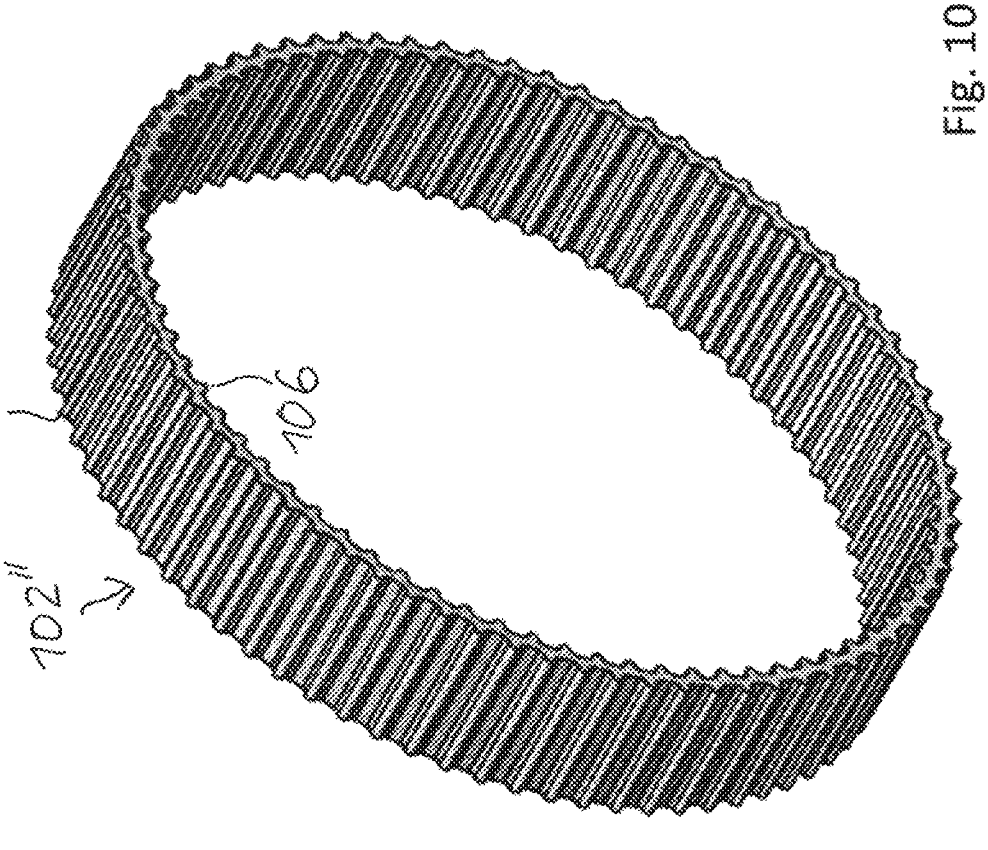
FIG. 10 shows a perspective view of a pin ring or toothed belt with an offset gap arrangement, wherein the pins or the teeth of the internal and external toothings are offset from one another.

FIG. 10 shows a perspective view of a pin ring 102" or toothed belt 102" with an offset gap arrangement, wherein the pins or teeth of an internal toothing 106 and an external toothing 105 are offset from one another. Namely, a tooth or pin of the external toothing 105 respectively faces a tooth base or pin of the internal toothing 106.

Figure 11:
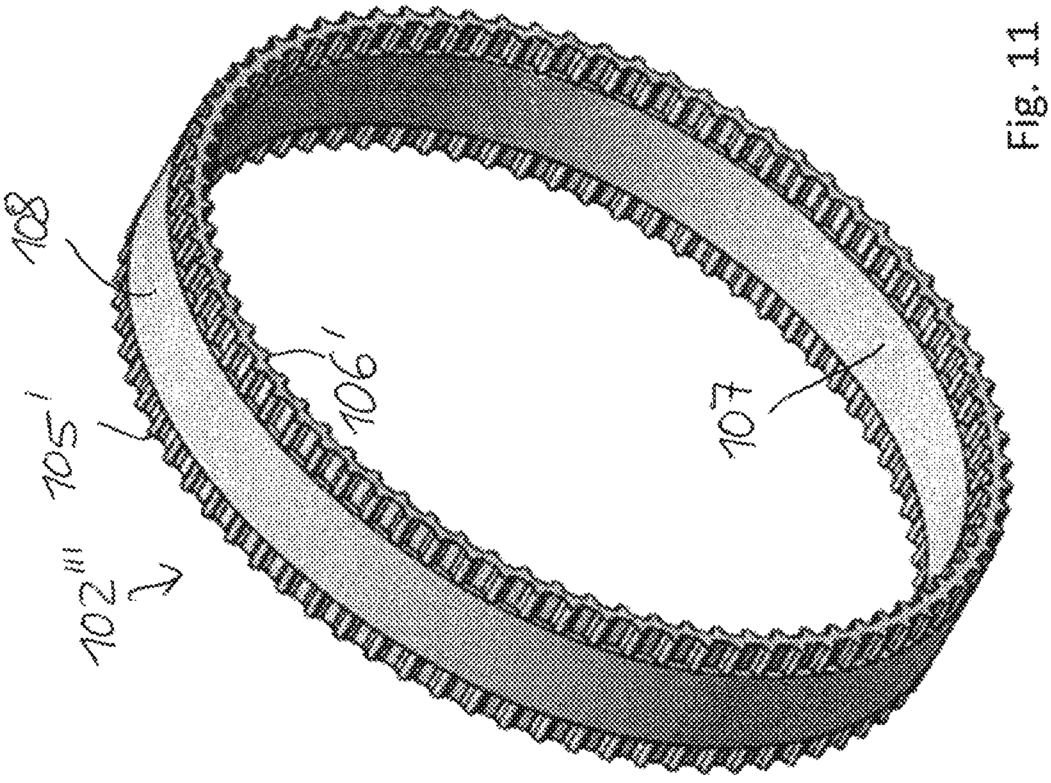
FIG. 11 shows a perspective view of another pin ring with an offset gap arrangement with a central bearing region on the inside and outside.

FIG. 11 shows a perspective view of another pin ring 102'" with an offset gap arrangement with central bearing regions 107, 108 on the inside and outside, with an internal toothing 105' being offset with respect to an external toothing 106'.

Figure 12:
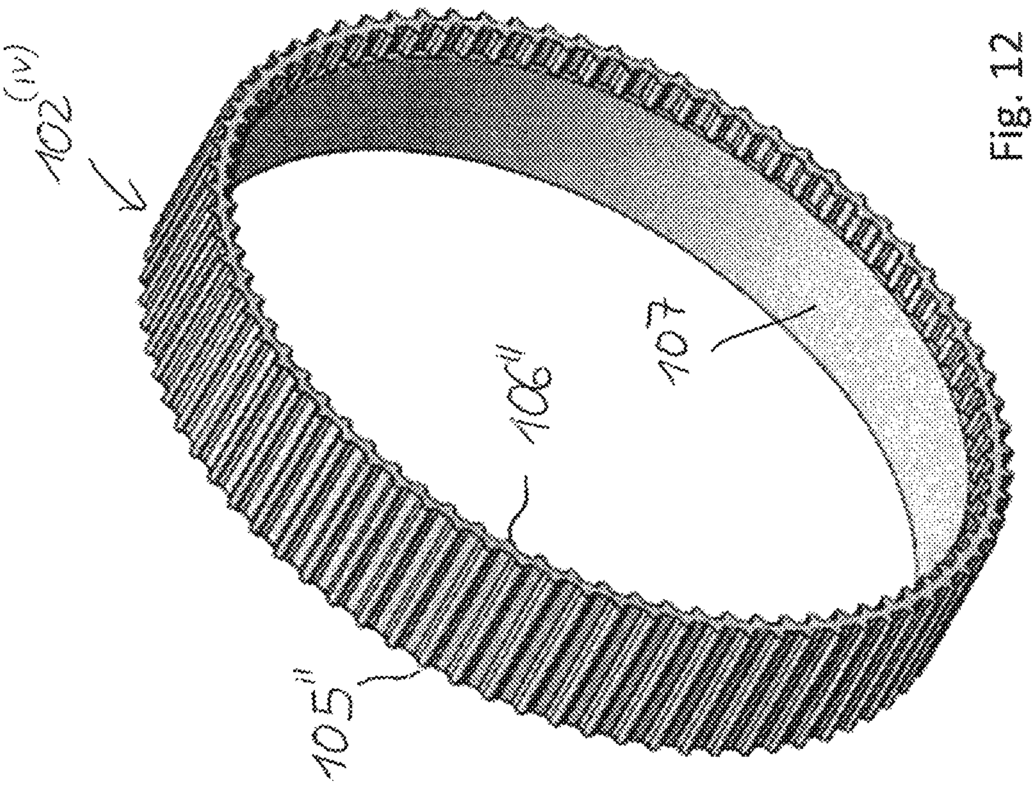
FIG. 12 shows a perspective view of another pin ring with an offset gap arrangement with a central bearing region on the inside.

FIG. 12 shows a perspective view of another pin ring 102$^{(IV)}$ with an offset gap arrangement with a central bearing region 107 on the inside, with an internal toothing 105" being offset with respect to an external toothing 106".

The central bearing region 107 on the inside may in particular serve to provide improved contact with a cam disk or an outer surface of a transmitter and the central bearing region 108 on the outside may in particular serve to establish improved contact with a cylindrical bearing surface of a transmission housing, which faces the outer surface of the transmitter.

If there is no central bearing region on the inside of the toothed belt, as for example in the toothed belt of FIG. 12, then an external toothing that matches the internal toothing of the toothed belt may be arranged radially inside the toothed belt for improved support of a transmitter. In particular in the case of a transmission with a driven inner gear, this external toothing may be arranged on a ball bearing, whereas this external toothing may be attached to a transmission housing in the case of a non-driven, static inner gear.

If there is no central bearing region on the outside of the toothed belt, as for example in the toothed belt of FIG. 12, then an external toothing that matches the external toothing of the toothed belt may be arranged radially outside the toothed belt for improved support. In particular in the case of a transmission with a driven outer gear, this external toothing may be arranged on a ball bearing, whereas in a transmission with a non-driven, static outer gear, as in the transmission of FIGS. 18-20, it may be attached to a transmission housing.

Figure 13:
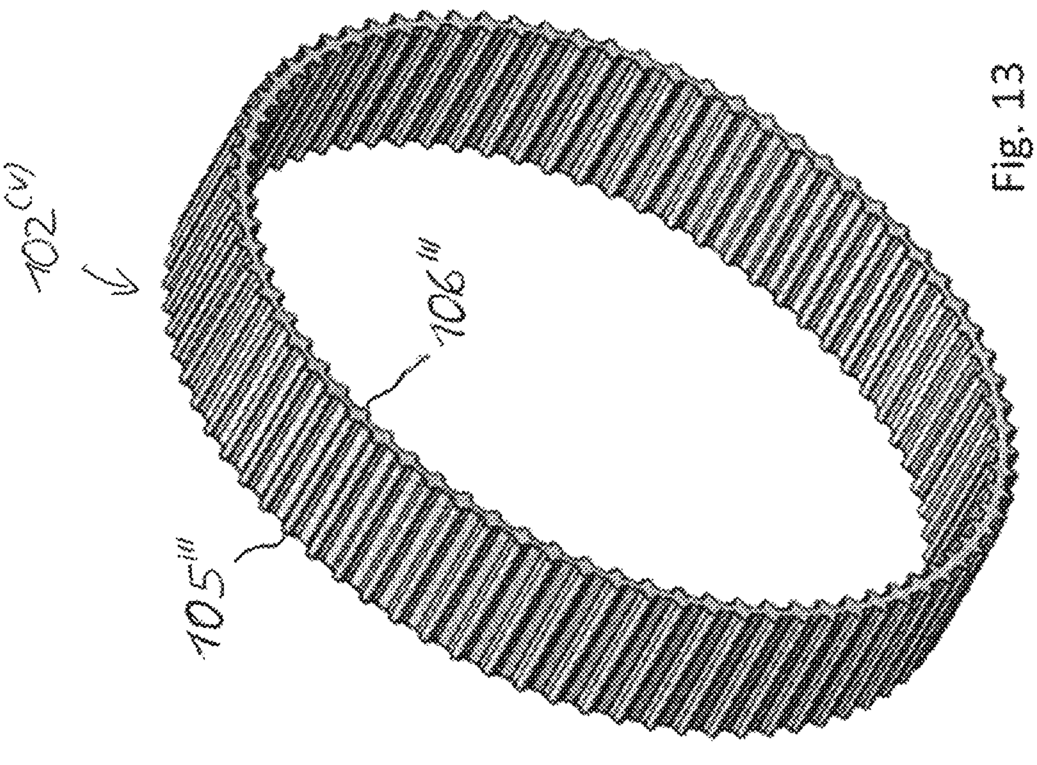
FIG. 13 shows a perspective view of another pin ring with a symmetrical gap arrangement in which the teeth or pins of the internal and external toothings face each other.

However, an outer gear toothing may also extend over the entire width of the toothed belt, whereby good contact is also achieved. FIG. 13 shows a perspective view of another pin ring 102$^{(V)}$ with a symmetrical gap arrangement in which the teeth or pins of an internal toothing 106'" and of an external toothing 105'" face each other.

Even in the case of a toothed belt with a symmetrical gap arrangement, as in FIG. 13, a central bearing region may be provided on an inside of the toothed belt or on an outside of the toothed belt.

Figure 14:
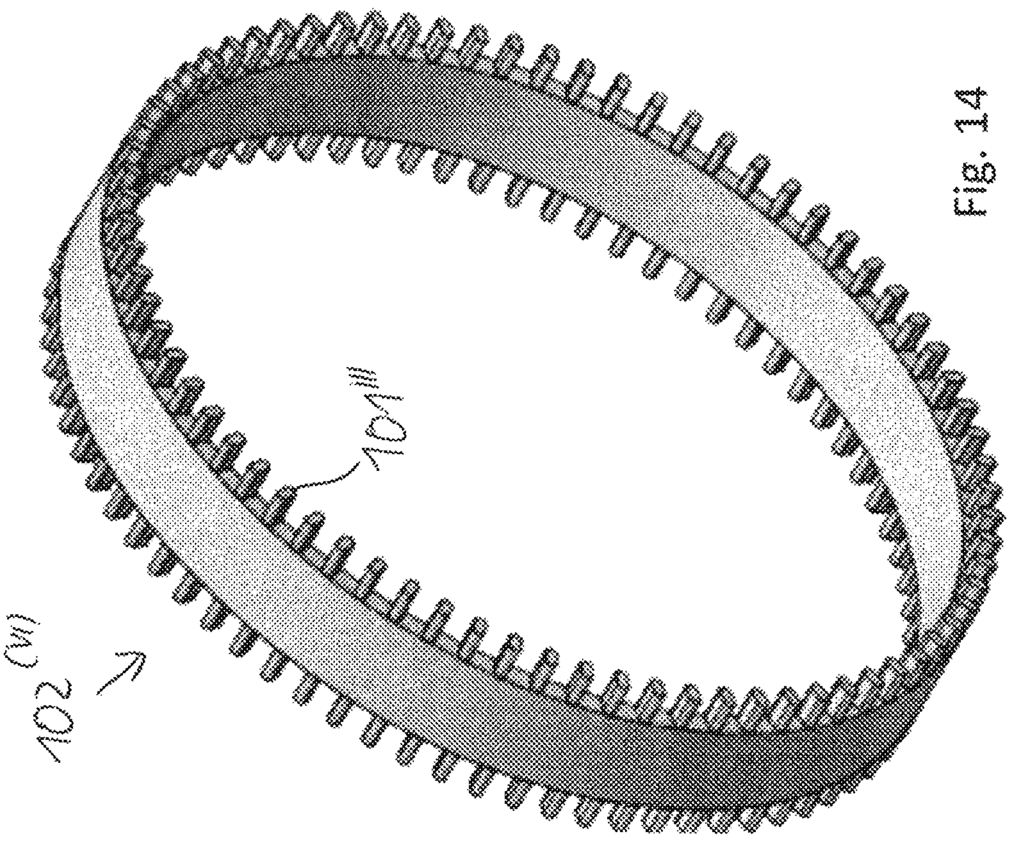
FIG. 14 shows a perspective view of another pin ring with symmetrical gap arrangement, in which radial gaps are arranged between the pins.

FIG. 14 shows a perspective view of another pin ring 102$^{(VI)}$ with symmetrical gap arrangement, in which radial gaps are arranged between pins 101'".

Figure 16:
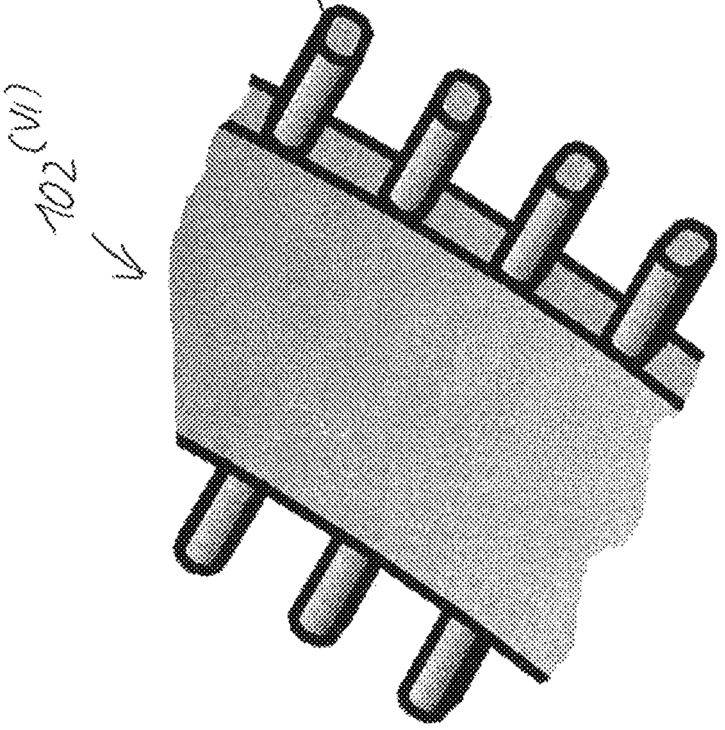
FIG. 16 shows an enlarged detail of FIG. 14.

In the pin ring of FIG. 14, the pins 101'" are shaped in such a way that their cross section forms an elongated oval, which can be seen particularly well in the enlarged detail of FIG. 16.

Namely, the cross section of the pins 101" forms a rectangle with two semicircular ends on the narrower sides of the rectangle, wherein the semicircular ends may be the same in each case.

Figure 15:
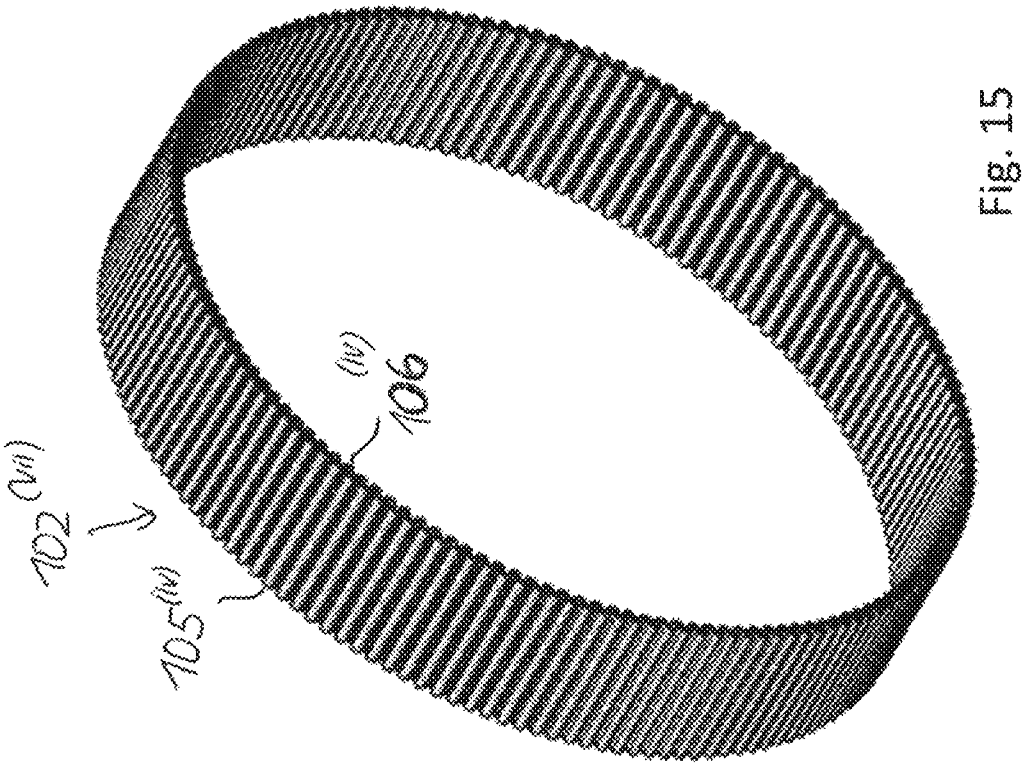
FIG. 15 shows a perspective view of another pin ring or toothed belt in which the tooth bases each form the tooth crests of the radially opposite toothing.

FIG. 15 shows a perspective view of another pin ring 102$^{(VII)}$ or toothed belt or double toothed ring 102$^{(VII)}$, in which the tooth bases each form the tooth crests of the radially opposite toothing. A rear side of an external toothing 105$^{(IV)}$ thus forms at the same time an internal toothing 106$^{(IV)}$ and vice versa.

Figure 17:
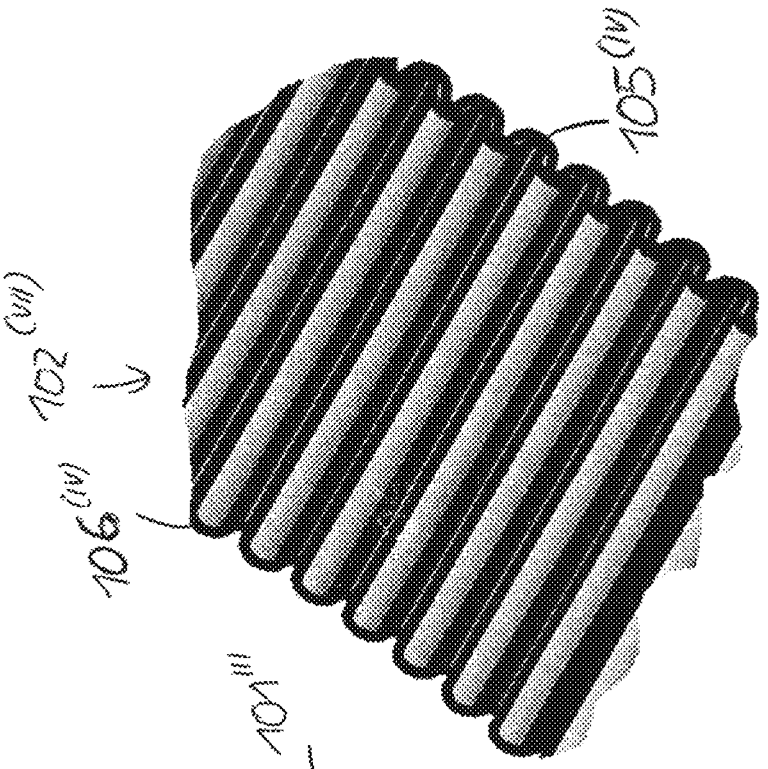
FIG. 17 shows an enlarged detail of FIG. 15.

The shape of the double toothed ring resembles a cylindrical strip of corrugated metal, which can be seen particularly well in the enlarged detail of FIG. 17.

The design of the double toothed ring according to FIG. 15 may provide good elasticity with simple and material-saving manufacture.

FIG. 16 shows an enlarged detail of FIG. 14.

FIG. 17 shows an enlarged detail of FIG. 15.

FIG. 18 shows a driven side frontal view of a harmonic pin ring transmission with an oval cam disc, in which a pin ring 102" according to FIG. 10 is installed as a traction mechanism and in which, from the inside to the outside, an inner region of a rotor transmitter unit 109 of an internal rotor motor (not shown), an inner gear driven shaft unit 110, a pin ring 102" according to FIG. 10 and an outer gear assembly 111 are shown.

Figure 19:
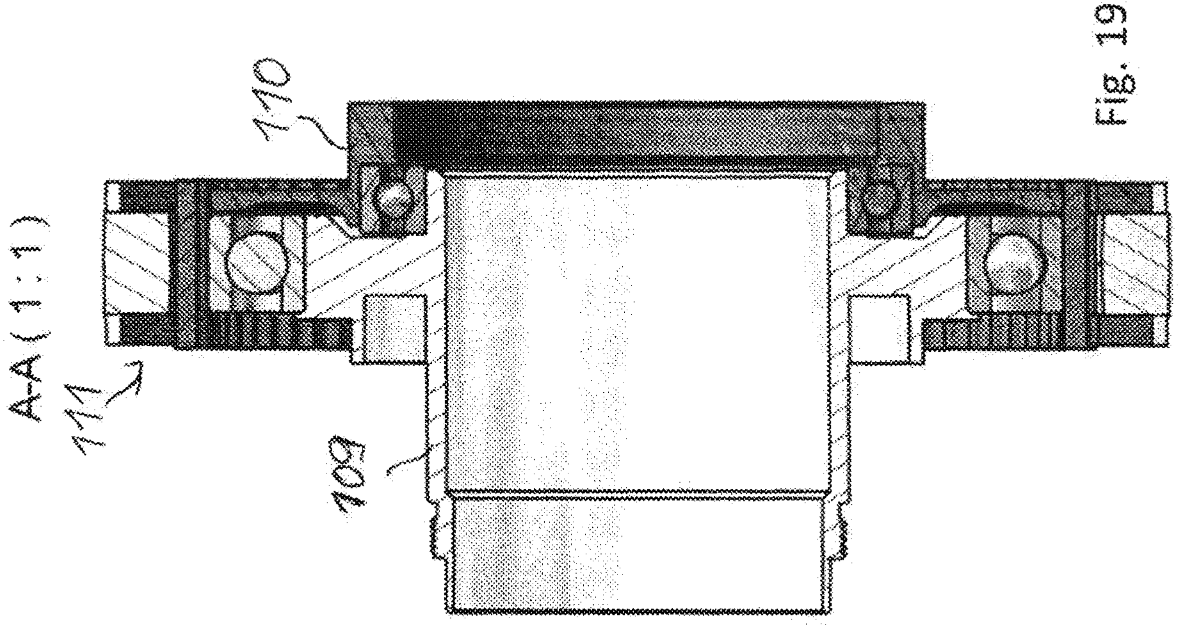
FIG. 19 shows a cross section along the section line A-A of FIG. 18.

FIG. 19 shows a cross section along the section line A-A of FIG. 18. The inner gear driven shaft unit 110 is mounted on the rotor transmitter unit via a driven shaft ball bearing. A deformable ball bearing is mounted on a cam disk of the rotor transmitter unit 109 and the pin ring according to FIG. 12 is arranged on the deformable ball bearing. The outer gear assembly 111 is arranged radially outside of the pin ring and consists of a drive side outer ring or outer gear, an outer gear holder, and a driven side outer ring or outer gear. The outer gear assembly is attached to a transmission housing not shown in FIGS. 18-20.

Figure 20:
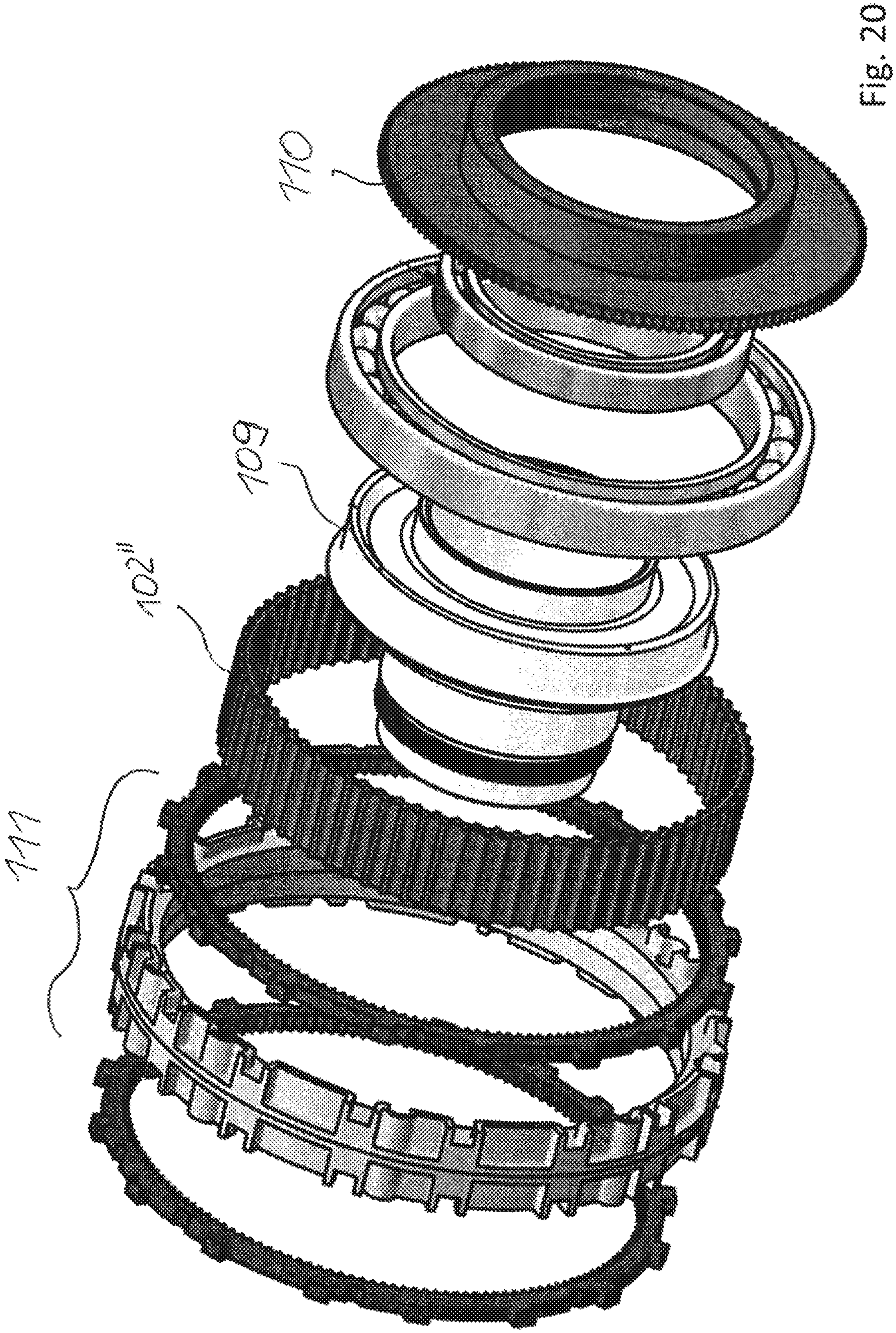
FIG. 20 shows an exploded view of the transmission of FIG. 18.

FIG. 20 shows an exploded view of the transmission of FIG. 18, in which, from left to right, the drive side outer ring or the driven side outer gear, the outer gear holder, the driven side outer ring or the driven side outer gear, the pin ring according to FIG. 13, the rotor-transmitter unit 109, the deformable ball bearing, the driven shaft ball bearing and the inner gear driven shaft unit 110 are shown.

Further components (not shown in FIG. 20) of a transmission or a motor transmission unit according to FIG. 20, may be configured similar to the transmissions shown in PCT/IB2017/057452, and in particular similar to the transmissions shown in FIGS. 1-10 and FIGS. 11-20 of PCT/IB2017/057452. Likewise, further details of the transmission of FIG. 20 not described here may be implemented as in the transmission of FIGS. 1-10 of PCT/IB2017/057452.

The transmission of FIG. 18 is only one example of the possible uses of the pin ring of FIG. 13 as a traction mechanism in a transmission. Rather, the pin ring of FIG. 13 and also the other pin rings shown in FIGS. 1-17 can also be used as traction mechanism in other transmissions. In particular, the pin rings can also be used in the transmissions that are disclosed above in PCT/IB2017/057452, which is incorporated into the present specification by reference, wherein the shape of the pins or the shape of the internal or external toothing are suitably adapted if necessary.

The pin rings shown in FIG. 1 to 17 are suitable to be used in a reduction gear as traction mechanism between an internal toothing and an external toothing, wherein the respective pin ring engages in the internal toothing and in the external toothing of the reduction gear. Specifically, this may be a transmission with a transmitter which lifts the pin ring from the internal toothing and presses it against the external toothing.

The following FIGS. 21-27 show transmission components of transmissions with a rotorless motor, in which the respective transmission is driven by deformation or displacement of a traction mechanism or displacement of an internal or external toothing by means of electromagnetic forces of a stator. The electromagnetic forces move a first toothing or pins along a second toothing, which is thereby set in a rotary movement, wherein the electromagnetic forces act predominantly in a radial direction.

This is in contrast to transmissions with a rotor, in which a rotary movement of a rotor is initially generated, from which a radial movement is only then generated, as in the case of a tension shaft transmission with a steel bushing mounted on a deformable ball bearing.

The transmission components of FIGS. 21-27 may in particular be used in an eccentric transmission, a cycloidal gear or a harmonic chain or pin ring transmission for generating a gear reduction or transmission. The transmission components of FIGS. 21-27 may in particular also be used in the transmissions disclosed in PCT/IB2017/057452, wherein the components lying in the torque curve between the stator and the inner and outer gear are replaced by the components shown schematically in FIGS. 21-27 or modified appropriately.

To generate the force on the pins or the toothing by means of an electromagnetic field of the stator, the toothing or the pins may be provided with magnetic regions or with permanent magnets or consist of a magnetic material. The toothing or the pins may also be guided by a mechanical guide in addition to being guided by the electromagnetic forces, in particular if the entire toothing or the entire pin ring is guided on a predetermined path, for example on an eccentric circular path.

Figure 21:
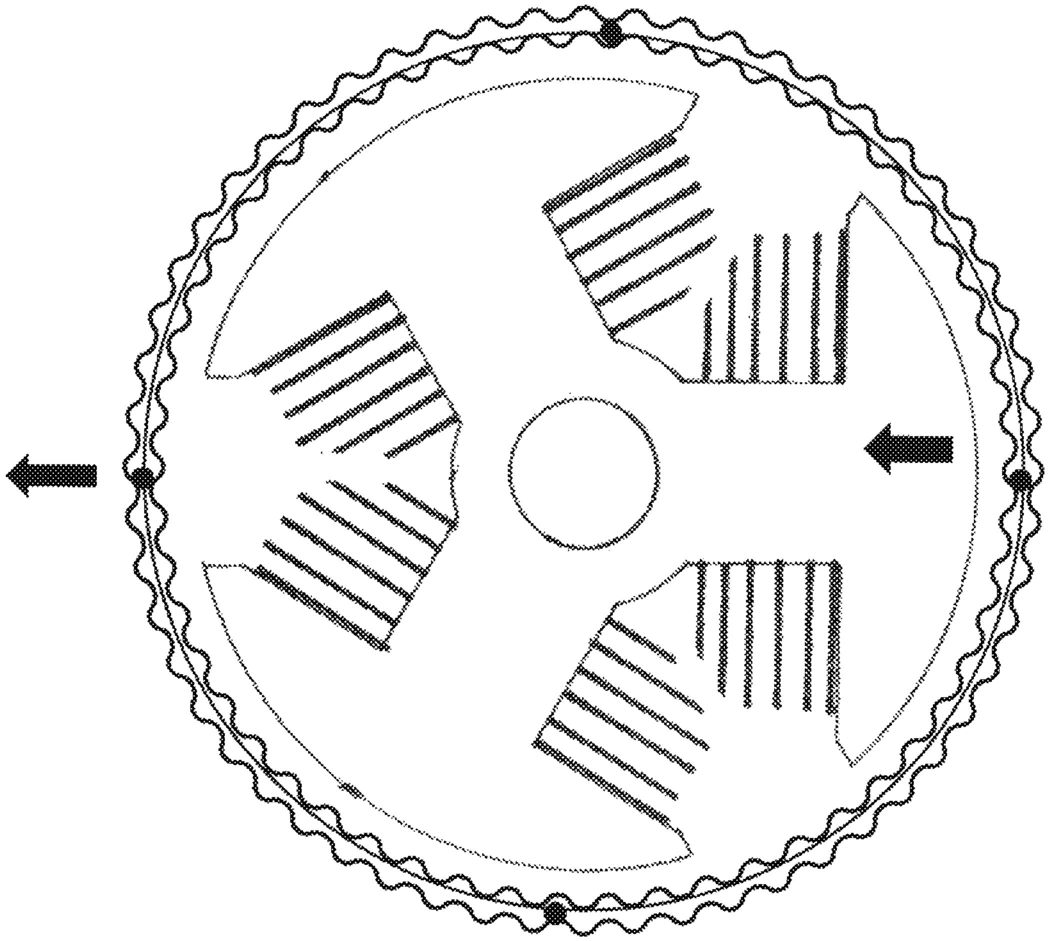
FIG. 21 shows a transmission with a three-pole stator that moves a pin ring by electromagnetic forces.
Figure 22:
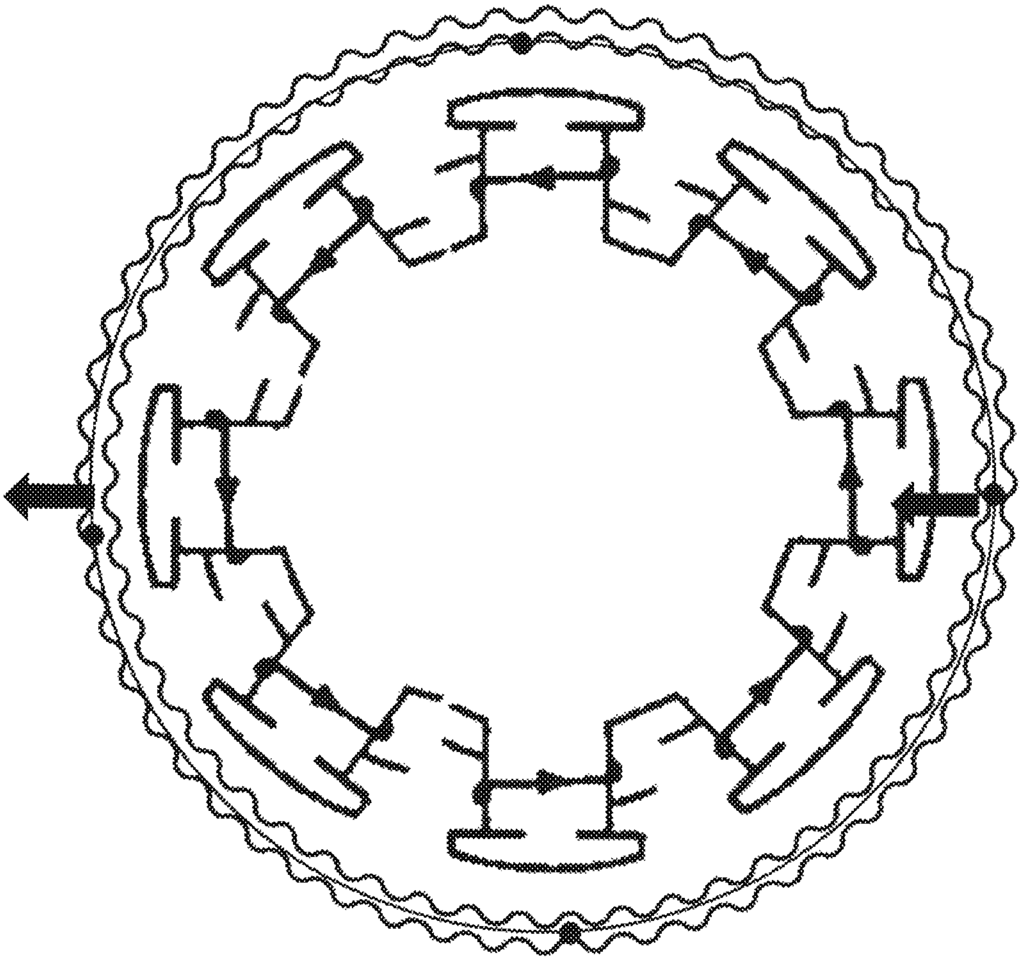
FIG. 22 shows a transmission with a six-pole stator that moves a pin ring by electromagnetic forces.

FIGS. 21 and 22 show transmissions in which a traction mechanism, in particular a pin ring, is moved along an internal toothing and an external toothing by electromagnetic forces of a motor.

In FIGS. 21 and 22 it is indicated by a lower arrow that a pin ring is moved away from an external toothing and is pressed into an internal toothing in a first region and is pressed away from the internal toothing and is pressed into an external toothing in a radially opposite second region.

The first region is a region of minimum contact or engagement with the external toothing and maximum contact or engagement with the internal toothing. The second region is a region of maximum contact or engagement with the external toothing and minimum contact or engagement with the internal toothing. The stator windings of the stator are controlled or energized in such a way that the first region and the opposite second region rotate around a central axis.

Figure 23:
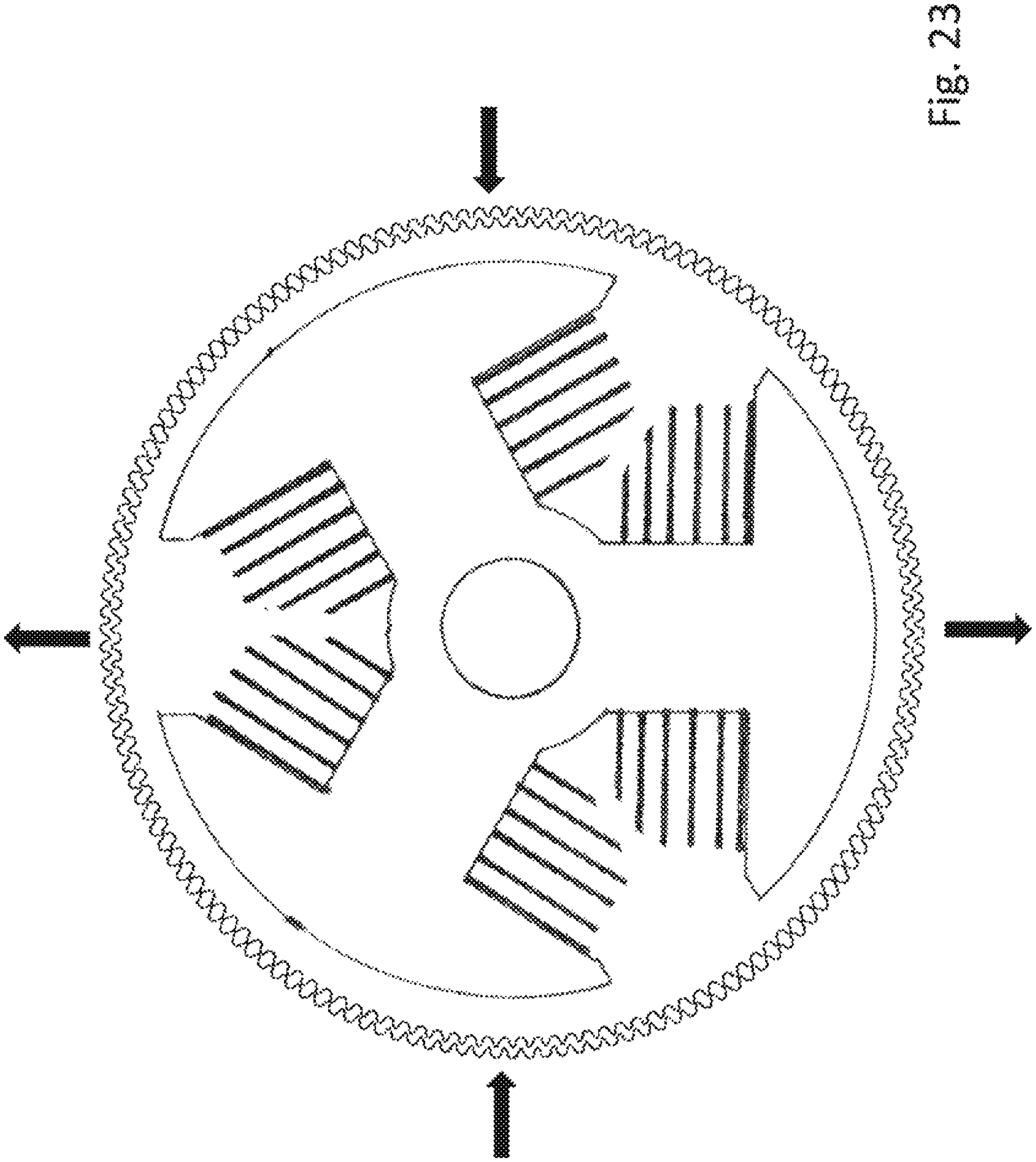
FIG. 23 shows a transmission with a three-pole stator that deforms a pin ring by electromagnetic forces.
Figure 24:
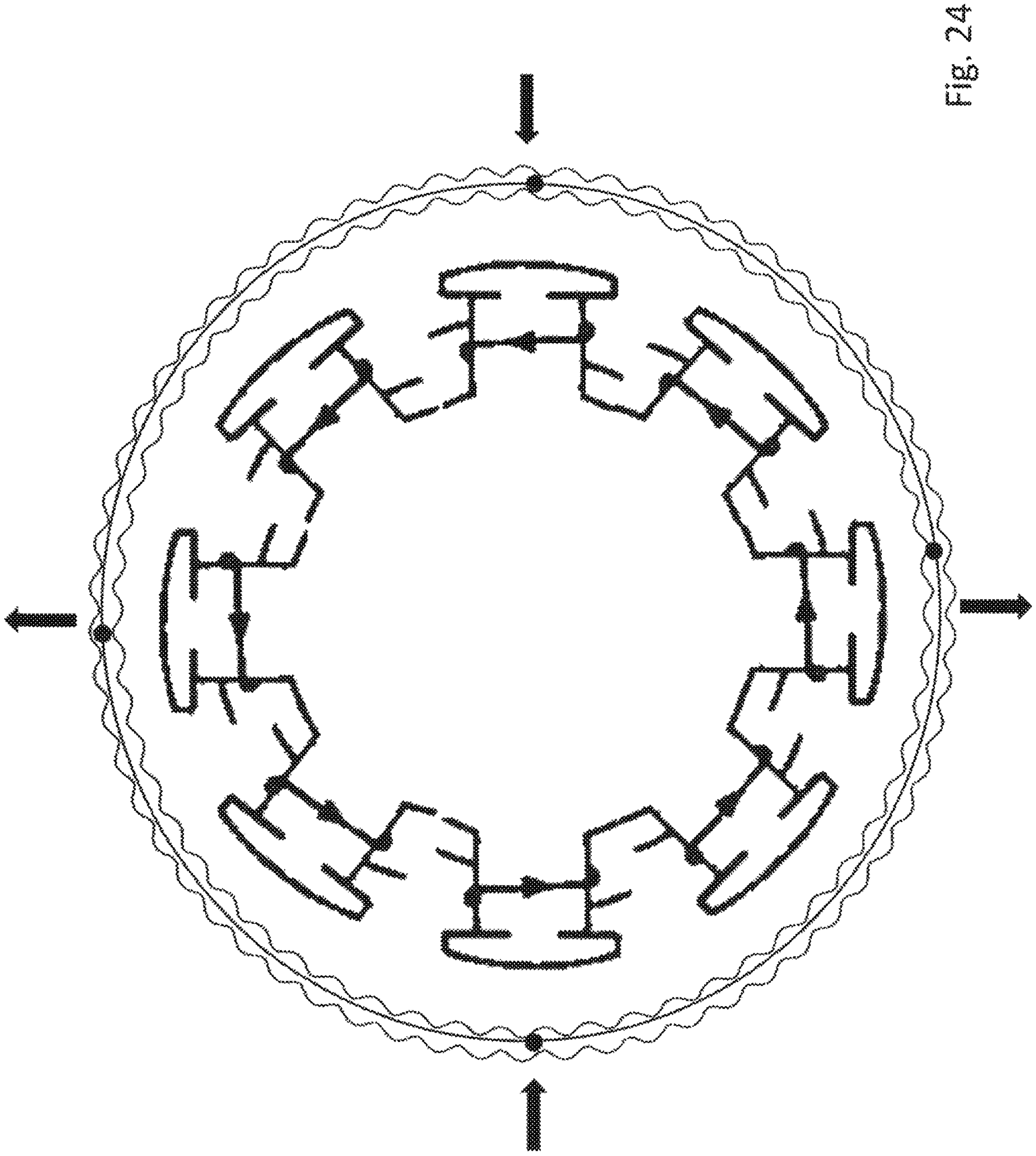
FIG. 24 shows a transmission with a six-pole stator that deforms a pin ring by electromagnetic forces.

FIGS. 23 and 24 show transmissions in which a traction mechanism, in particular a pin ring, is elliptically deformed by electromagnetic forces of a motor and is thereby moved along an internal toothing and an external toothing.

In FIGS. 23 and 24, it is indicated by a vertical pair of arrows that a pin ring is being pushed apart in a first region and a second region radially opposite thereto, and it is indicated by a horizontal pair of arrows that the pin ring is being drawn together in a third region and a fourth region radially opposite thereto. In this case, the pushing apart, the contraction or both takes place by electromagnetic forces exerted by the stator, wherein the electromagnetic forces may in particular be electrostatic forces. The third and the fourth region are offset by 90 degrees with respect to the first region and the second region.

The first region and the second region are regions of minimum contact or engagement with the internal toothing and maximum contact or engagement with the internal toothing. The third region and the fourth region are regions of maximum contact or engagement with the internal toothing and minimum contact or engagement with the external toothing. The stator windings of the stator are controlled or energized in such a way that the first region, the second region, the third region and the fourth region rotate around a central axis.

Figure 25:
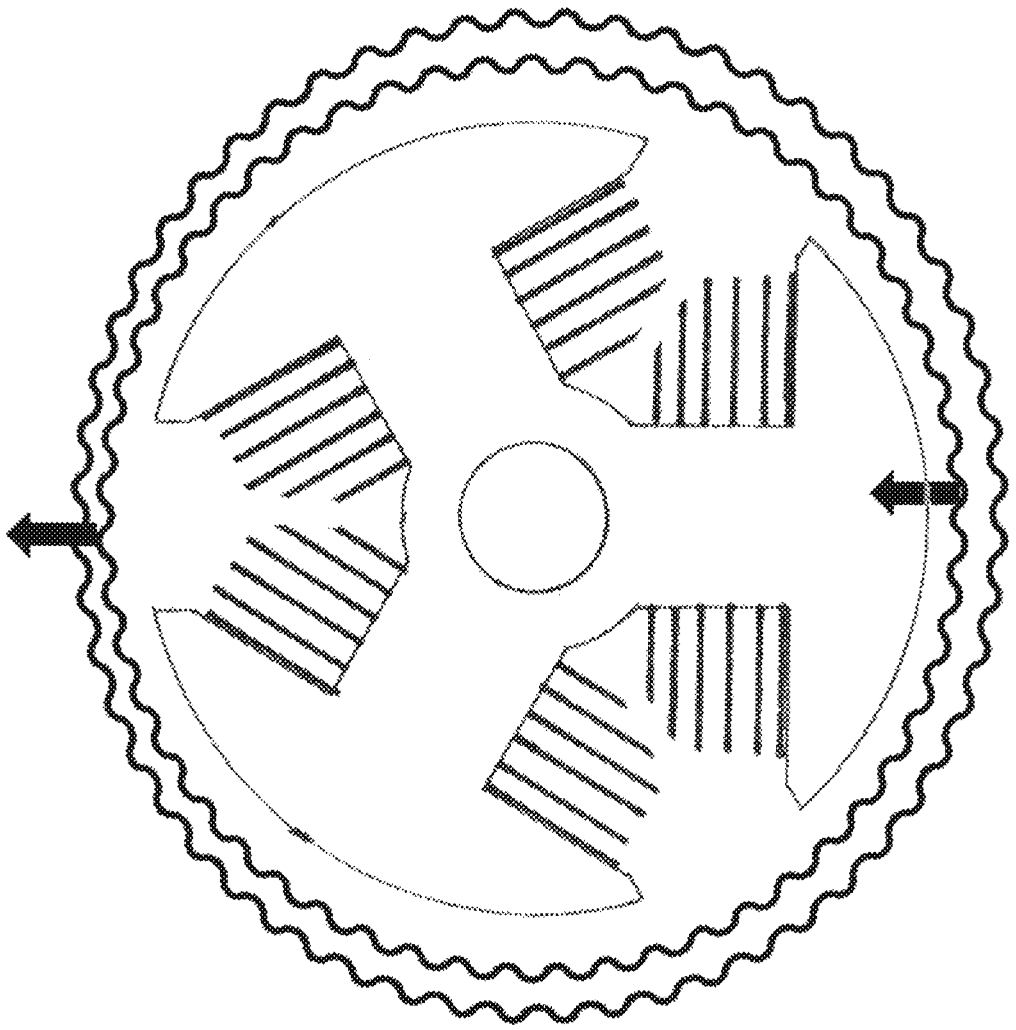
FIG. 25 shows a transmission with a six-pole stator that moves an internal toothing by electromagnetic forces.
Figure 26:
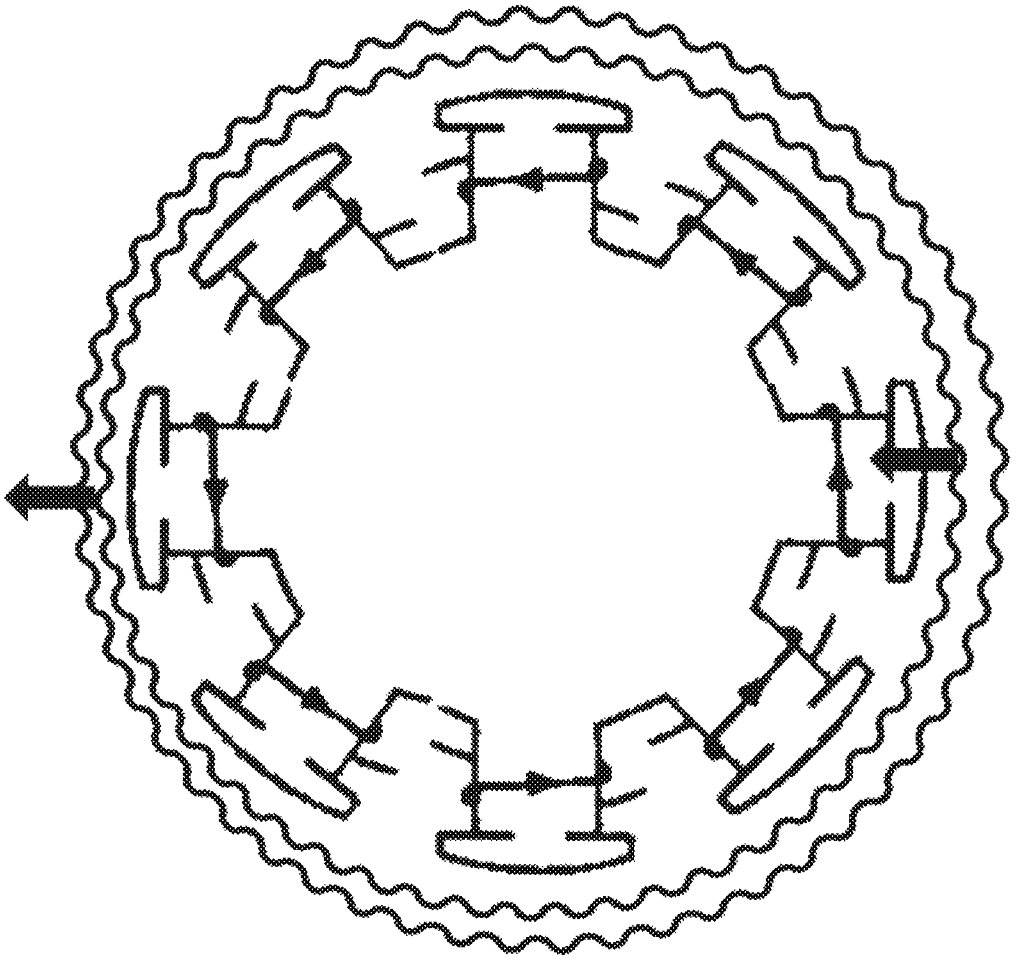
FIG. 26 shows a transmission with a six-pole stator that moves an internal toothing by electromagnetic forces.

FIGS. 25 and 26 show transmissions in which an internal toothing is moved along an external toothing by electromagnetic forces of a stator, similar to what is the case, for example, with a cycloidal gear. In these transmission variants, no traction mechanism is arranged between the internal toothing and the external toothing. Instead, the internal toothing engages directly with the external toothing or rolls off on the external toothing.

In FIGS. 25 and 26, a lower arrow indicates that an internal toothing is moved away from an external toothing in a first region and is pressed into the external toothing in a second region radially opposite thereto.

The first region is a region of minimal contact or engagement with the external toothing. The second region is a region of maximum contact or engagement with the external toothing. The stator windings of the stator are controlled or energized in such a way that the first region and the second region opposite to it rotate around a central axis.

FIGS. 21-26 show three- or six-pole electric motors or stators. However, electric motors with 4 pole pieces or with more than 6 pole pieces may also be used. For the sake of clarity, the windings in the three-pole motors are not shown in FIGS. 21-26 and the connections of the windings in the six-pole motors are not shown in FIGS. 21-26.

Each pole piece of an electric motor according to the present specification may have its own winding, which is controlled separately, or pole pieces may be connected in series and controlled together. The pole pieces connected in series may have the same number of windings or a different number of windings and they may be wound in the same direction or in opposite directions. In particular, opposite pole pieces may each be connected in series and wound in opposite directions in order to generate equally large opposing forces, which is advantageous, for example, for an elliptical deformation of a pin ring.

Furthermore, it is also possible that not every pole piece is provided with a winding, but that, for example, only every second pole piece is wound. If the pole pieces can be controlled individually, for example by power electronics, or if pairs of opposite pole pieces can be controlled individually, this results in an improved fine control of the control.

Figure 27:
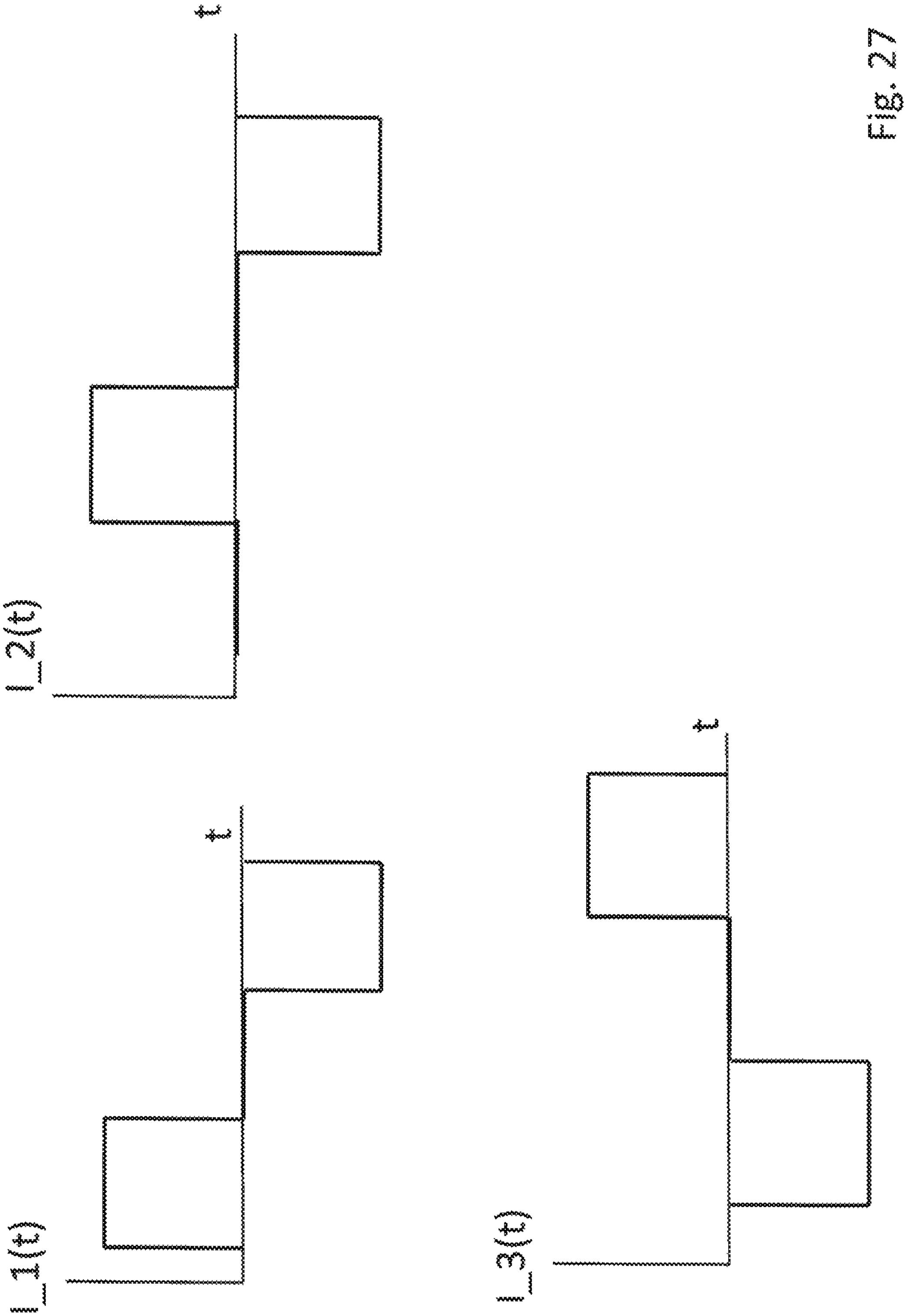
FIG. 27 shows an energization of stator windings of the transmission of FIG. 21.

FIG. 27 shows an example of a simple control of a three-pole motor, in which the pole pieces of the three-pole motor are energized separately, wherein a predefined signal is used. The current feed I3($t$) of the third pole piece is opposite to the current feed I1($t$) of the first pole piece and the current feed I2($t$) of the second pole piece is phase shifted with respect to the current feed of the first pole piece by the duration of the constant signal of I1($t$). The opposite current feed can be achieved, for example, by opposite winding or also by separate current feed.

Depending on the requirements, more complex controls are also possible. For example, an amplitude may vary instead of being constant in sections, as shown in FIG. 27. Furthermore, to improve the control of the stator coils, a control loop such as a PID controller may be used instead of the feed-forward control shown in FIG. 27.

The current signals in the stator coils may be used as sensor signals for the control loop, thereby avoiding that separate sensors, such as Hall sensors, are installed. For example, the current signals may be measured in a control pause in which the respective stator winding is not energized. The parameters of the control loop can be changed as required, for example to generate a predetermined torque or to generate a predetermined rotational speed.

Figure 28:
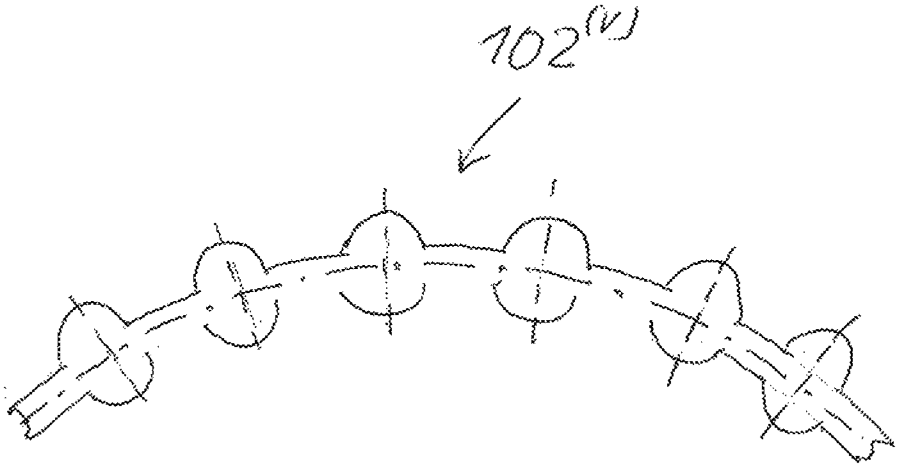
FIG. 28 shows a cross section through a pin ring with a symmetrical gap arrangement.

FIG. 28 shows a cross section through a toothed belt 102$^{(V)}$ with a symmetrical gap arrangement.

Figure 29:
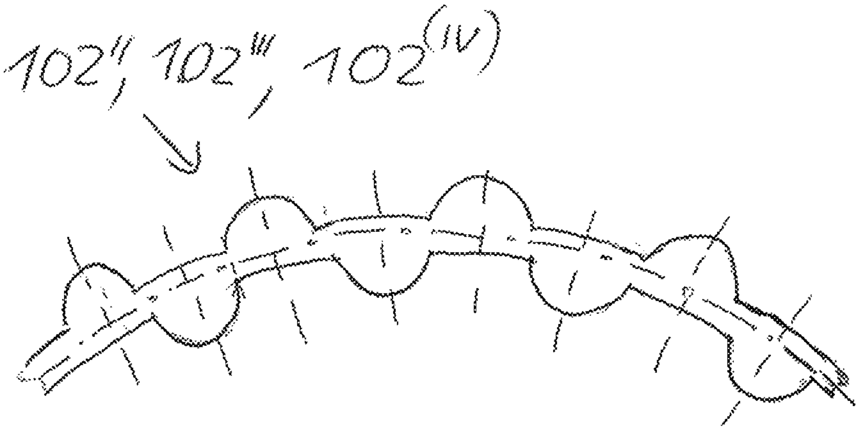
FIG. 29 shows a cross section through a pin ring with a shifted gap arrangement.

FIG. 29 shows a cross section through a toothed belt 102", 102"', 102$^{(IV)}$ with a shifted gap arrangement.

Figure 30:
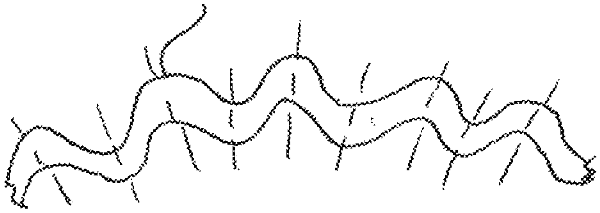
FIG. 30 shows a cross section through a pin ring with a shifted gap arrangement in which a rear side of the internal toothing forms the external toothing.

FIG. 30 shows a cross section through a toothed belt 102$^{(VII)}$ with a shifted gap arrangement, in which a rear side of the internal toothing forms the external toothing. In FIGS. 28-30, a thickness of the toothed belt is not drawn to scale with respect to the height of the toothing.

The above-mentioned exemplary embodiments and further exemplary embodiments of the present specification are also disclosed in the features of the following first listing, which can be combined with other features of the present specification.

The dimensioning of opposing toothings and, if present, an intermediate transmission means may, according to the present specification, in particular be chosen such that there is a complete tooth engagement, both in a pin ring transmission as well as in a tension shaft transmission or in a cycloidal gear, wherein the pin ring transmission and the tension shaft transmission may be built as a configuration with an eccentric transmitter or as a configuration with an oval transmitter.

1. Harmonic pin ring transmission, comprising
   a first gear with a first toothing and
   a second gear with a second toothing,
   a pin ring with round engagement regions,
   a revolving transmitter for drawing the engagement regions of the pin ring in the first toothing of the first gear and in the second toothing of the second gear,
   wherein the first gear, the transmitter and the second gear are arranged concentrically with each other and the transmitter is arranged radially inside the pin ring and
   wherein the pin ring is disposed between the first gear and the second gear, wherein the transmitter comprises a transmitter disk disposed eccentrically to a transmission central axis, wherein the first toothing of the first gear and the second toothing of the second gear are shaped according to an epicyclic construction,
   where locations on the respective tooth surface of the first toothing and the second toothing are each determined by a radial distance from the transmission central axis as a function of a cycle angle,
   wherein the radial distance is in turn determined by an equidistant to a gear trajectory,
   wherein locations on the gear trajectory are respectively determined by the vector sum of a cycle vector and an epicycle vector, wherein a tail of the cycle vector lies on the transmission central axis and a tail of the epicycle vector lies in the tip of the cycle vector, wherein an epicycle angle of the epicycle vector is n times as large as that cycle angle and a length of the cycle vector is greater than a length of the epicycle vector, wherein n is a number of the round engagement regions of the harmonic pin ring transmission which is at least three.
2. Harmonic pin ring transmission according to item 1, wherein the first gear is an inner gear with an external toothing and the second gear is an outer gear with an internal toothing, wherein for the external toothing of the inner gear, the epicycle angle is measured in the same direction as the cycle angle and the equidistant is an inner equidistant,
   and wherein for the internal toothing of the outer gear, the epicycle angle is measured in the opposite direction to the cycle angle and the equidistant is an outer equidistant.
3. Harmonic pin ring transmission according to item 1, wherein the first gear and the second gear are each an outer gear with an internal toothing,
   wherein for the internal toothing of the two outer gears, the epicycle angle is measured in the opposite direction to the cycle angle and the equidistant is an outer equidistant.
4. Harmonic pin ring transmission according to item 3, wherein the respective equidistant is an equidistant at a distance of the sum of a radius of the round engagement regions and a correction value, wherein the correction value depends on a back lash.
5. Harmonic pin ring transmission according to item 3 or 4, wherein the harmonic pin ring transmission comprises a rolling bearing which rests on the transmitter disk, wherein the cycle radius is equal to half the diameter of the rolling bearing.
6. Harmonic pin ring transmission according to item 3 or 4, wherein the cycle radius is equal to half the diameter of the transmitter disk.
7. Harmonic pin ring transmission according to any of items 3 to 6, wherein the epicycle radius is equal to a half an eccentric offset by which the transmitter disk is offset from the transmission central axis.
8. Harmonic pin ring transmission according to any of items 3 to 7, wherein a drive shaft is connected to the transmitter.
9. Harmonic pin ring transmission according to item 8, wherein a driven shaft is connected to the first gear.
10. Harmonic pin ring transmission according to item 8, wherein a driven shaft is connected to the second gear.
11. Harmonic pin ring transmission according to item 8, wherein a driven shaft is connected to the pin ring.
12. Inner gear for a harmonic pin ring transmission with an external toothing, wherein the tooth surface of the external toothing is determined by a radial distance from a central axis of the inner gear as a function of a cycle angle, wherein the radial distance from the central axis is in turn determined by an inner equidistant to a gear trajectory, wherein a location on the gear trajectory is determined by the vector sum of a cycle vector, a first epicycle vector and a second epicycle vector, wherein a tail of the cycle vector lies on the central axis, a tail of the first epicycle vector lies in the tip of the cycle vector, and a tail of the second epicycle vector lies in the tip of the first epicycle vector, and wherein an epicycle angle of the first epicycle vector is n−1 times as large as the cycle angle and an epicycle angle of the second epicycle vector is n−3 times as large as the cycle angle, wherein n is a number of pins of the harmonic pin ring transmission which is at least four, wherein the first epicycle angle is measured in the same direction as the cycle angle and the second epicycle angle is measured in an opposite direction to the cycle angle, and wherein a length of the cycle vector is greater than the sum of the lengths of the first epicycle vector and the second epicycle vector, and a length of the first epicycle vector is greater than a length of the second epicycle vector.

13. Outer gear for a harmonic pin ring transmission with an internal toothing, wherein locations on the tooth surface of the internal toothing are each determined by a radial distance from a central axis of the outer gear as a function of a cycle angle,
   wherein the radial distance is in turn defined by an outer equidistant to a gear trajectory, wherein locations on the gear trajectory are each determined by the vector sum of a cycle vector, a first epicycle vector and a second epicycle vector, wherein a tail of the cycle vector lies on the central axis, a tail of the first epicycle vector lies in the tip of the cycle vector, and a tail of the second epicycle vector lies in the tip of the first epicycle vector,
   and wherein an epicycle angle of the first epicycle vector is (n+1) times as large as the cycle angle and an epicycle angle of the second epicycle vector is (n+3) times as large as the cycle angle, wherein n is a number of pins of the harmonic pin ring transmission which is at least four, wherein the first epicycle angle is measured in an opposite direction to the cycle angle and the second epicycle angle is measured in the same direction as the cycle angle, and wherein a length of the cycle vector is greater than the sum of the lengths of the first epicycle vector and the second epicycle vector, and a length of the first epicycle vector is greater than a length of the second epicycle vector.

14. Harmonic pin ring transmission, comprising
   an inner gear according to item 12 and
   an outer gear according to item 13,
   a pin ring with round engagement regions,
   a revolving transmitter for drawing the engagement regions of the pin ring in the internal toothing of the outer gear and in the external toothing of the inner gear, wherein the inner gear, the transmitter and the outer gear are arranged concentrically with each other, the transmitter is arranged radially inside the pin ring and wherein the pin ring is disposed between the inner gear and the outer gear.

15. Harmonic pin ring transmission, comprising
   a first outer gear according to item 13 and
   a second outer gear according to item 13,
   a pin ring with round engagement regions,
   a revolving transmitter for drawing the engagement regions of the pin ring in the internal toothing of the first outer gear and in the internal toothing of the second outer gear, wherein the transmitter, the first outer gear and the second outer gear are arranged concentrically with each other, the transmitter is arranged radially inside the pin ring and wherein the pin ring is arranged in the axial direction between the first outer gear and the second outer gear.

16. Harmonic pin ring transmission according to item 14 or item 15, wherein a drive shaft is connected to the transmitter.

17. Harmonic pin ring transmission according to item 16, wherein a driven shaft is connected to the pin ring.

18. Harmonic pin ring transmission according to item 14, wherein a drive shaft is connected to the transmitter and a driven shaft is connected to the inner gear.

19. Harmonic pin ring transmission according to item 14, wherein a drive shaft is connected to the transmitter and a driven shaft is connected to the outer gear.

20. Harmonic pin ring transmission according to item 15, wherein a drive shaft is connected to the transmitter and a driven shaft is connected to one of the two outer gears.

21. Harmonic pin ring transmission according to any of items 14 to 20, wherein the respective equidistant is an equidistant at a distance of the sum of a radius of the round engagement regions and a correction value, wherein the correction value is determined by a back lash.

22. Harmonic pin ring transmission according to any of items 14 to 21, wherein the transmitter comprises an oval shaped cam disk and a flexible rolling bearing resting on the oval shaped cam disk, wherein the cycle radius is equal to the sum of half the diameter of the flexible rolling bearing and a correction value.

23. Harmonic pin ring transmission according to any of items 14 to 21, wherein the transmitter comprises a first circular disk arranged eccentrically to a transmission central axis and a second circular disk arranged eccentrically to the transmission central axis, wherein the cycle radius is equal to the sum of a mean radius of the envelope of the two eccentrically arranged circular disks and a correction value.

24. Harmonic pin ring transmission according to any of items 14 to 23, wherein the first epicycle radius is less than or equal to the sum of half a pin ring stroke and a second correction value, wherein the second correction value is less than or equal to zero.

25. Harmonic pin ring transmission according to any of items 14 to 24, wherein the length of the second epicycle vector is one third of the length of the first epicycle vector.

The embodiments described above and further embodiments of the present specification are also disclosed in the features of the following second listing, which may be combined with other features of the present specification.

1. Harmonic pin ring transmission having an input shaft and an output shaft, the transmission comprising:
   a first outer gear, an inner gear concentrically disposed with respect to the first outer gear in a first axial plane, a second outer gear arranged in a second axial plane,
   a traction mechanism extending between the first outer gear and the inner gear,
   a revolving transmitter which lifts the traction mechanism from an outer circumference of the inner gear and presses it against an inner circumference of the first outer gear, wherein the transmitter comprises a hollow drive shaft and a cam disk, wherein the cam disk is disposed in a third axial plane located between the first axial plane and the second axial plane, and wherein the cam disk is formed in one piece with the hollow drive shaft.

2. Harmonic pin ring transmission according to item 1, wherein the traction mechanism is formed as a pin ring, wherein pins protrude from a middle portion on two opposite sides, wherein the middle portion is disposed in the third axial plane, and wherein the revolving transmitter lifts the pins from an outer circumference of the inner gear and presses them against an inner circumference of the first outer gear.

3. Harmonic pin ring transmission according to item 1 or item 2, wherein a circumference of the cam disk has an oval shape.

4. Harmonic pin ring transmission according to item 1 or item 2, wherein a circumference of the cam disk has a circular shape and is arranged eccentrically to a transmission central axis.

5. Harmonic pin ring transmission according to any of items 1 to 4, wherein a rolling bearing is arranged between the cam disk and the traction mechanism.

6. Harmonic pin ring transmission according to any of items 1 to 5, wherein the transmitter 5 consists essentially of aluminum.

7. Harmonic pin ring transmission according to any of items 1 to 6, wherein the transmitter comprises a ring which is connected via connecting struts with the hollow drive shaft.

8. Harmonic pin ring transmission having an input shaft and an output shaft, the transmission comprising:

a first outer gear, an inner gear concentrically disposed with respect to the first outer gear in a first axial plane, a second outer gear arranged in a second axial plane, a traction mechanism extending between the first outer gear and the inner gear, a revolving transmitter which lifts the traction mechanism from an outer circumference of the inner gear and presses it against an inner circumference of the first outer gear, wherein the transmitter comprises a hollow drive shaft and a cam disk, wherein the cam disk is disposed in a third axial plane located between the first axial plane and the second axial plane, and wherein the first outer gear is formed by a first outer ring and the second outer gear is formed by a second outer ring, wherein the first ring and the second ring are inserted into a support ring.

9. Harmonic pin ring transmission according to item 8, wherein the first outer ring and the second outer ring are each made of plastic.

10. Harmonic pin ring transmission according to item 8 or item 9, wherein the first outer ring and the second outer ring each comprise radially outwardly projecting journals which are distributed over the circumference of the respective outer ring, and wherein the support ring comprises matching recesses into which the journals are inserted.

11. Harmonic pin ring transmission according to any of items 8 to 10, wherein the support ring is made of aluminum.

12. Harmonic pin ring transmission according to any of items 8 to 11, wherein the support ring comprises two partial rings, which abut in the axial direction.

13. Harmonic pin ring transmission according to any of items 8 to 12, wherein the first outer ring, the second outer ring and the support ring comprise screw holes matching each other.

14. Harmonic pin ring transmission according to item 13, wherein screws are passed through screw holes of a transmission cover and through the matching screw holes of the first outer ring, the support ring and the second outer ring and are screwed into a thread of a transmission housing of the harmonic pin ring transmission.

15. Harmonic pin ring transmission having an input shaft and an output shaft, the transmission comprising:

a first outer gear, an inner gear concentrically disposed with respect to the first outer gear in a first axial plane, a second outer gear arranged in a second axial plane, a traction mechanism extending between the first outer gear and the inner gear, a revolving transmitter which lifts the traction mechanism from an outer circumference of the inner gear and presses it against an inner circumference of the first outer gear, wherein the transmitter comprises a hollow drive shaft and a cam disk, wherein the cam disk is disposed in a third axial plane located between the first axial plane and the second axial plane, and comprising a hollow output shaft which is mounted in the inner gear via a motor freewheel, and a pedal shaft, which is mounted in the hollow output shaft via a pedal shaft freewheel, wherein the pedal shaft comprises a receiving region for the motor freewheel on an outer circumference and comprises a receiving region for the pedal shaft freewheel on an inner circumference.

16. Harmonic pin ring transmission according to item 15, wherein the motor freewheel is configured as a clamp roller freewheel and the pedal shaft freewheel is configured as a pawl freewheel.

17. Harmonic pin ring transmission according to item 15 or item 16, wherein the driven shaft extends in the axial direction on the output side of the hollow drive shaft, wherein a ball bearing is arranged between the hollow output shaft and the pedal shaft, and wherein the hollow output shaft comprises a fastening region for an output element.

18. Freewheel assembly having an outer clamp roller freewheel and an inner pawl freewheel, comprising:

a hollow drive shaft, a hollow output shaft, a pedal shaft, wherein the pedal shaft, the hollow output shaft and the hollow drive shaft are arranged concentrically to one another, the hollow output shaft is arranged radially inside the hollow drive shaft and the pedal shaft is arranged radially inside the hollow output shaft, wherein the hollow output shaft comprises a stair-shaped pawl engagement region at an inner circumference and comprises a stair-shaped clamp roller rolling region at an outer circumference, wherein the pedal shaft comprises a star-shaped receiving region for pawls, wherein the star-shaped receiving region comprises pawl seats and spring seats arranged adjacent to the pawl seats.

19. Freewheel assembly according to item 18, wherein the stair-shaped clamp body rolling region on the outer circumference of the hollow output shaft and the stair-shaped pawl engagement region on the inner circumference of the hollow output shaft are located in essentially the same axial plane.
20. Freewheel assembly according to item 18 or item 19, wherein the hollow drive shaft comprises a disk-shaped region with an external toothing,
    which is provided on an outer circumference of the disk-shaped region.
21. Freewheel assembly according to any of items 18 to 20, wherein the hollow output shaft comprises an annular thickening at a first end and comprises a fastening region for an output means at a second end opposite the first end.
22. Freewheel assembly according to any of items 18 to 21, wherein the outer circumference of the hollow output shaft comprises a bearing region for a ball bearing.
23. Freewheel assembly according to any of items 18 to 22, wherein the inner circumference of the hollow output shaft comprises a bearing region for a ball bearing.
24. Freewheel assembly according to any of items 18 to 23, wherein the inner circumference of the hollow output shaft comprises an internal thread at one end.
25. Freewheel assembly according to any of the 5 preceding items 18 to 24, further comprising:
    pawls which are rotatably mounted in the pawl seats and spring elements
    which are arranged in the spring seats and connected to the pawls,
    a freewheel cage with webs and clamp rollers arranged between the webs,
    wherein the freewheel cage and the clamp rollers are arranged radially between the clamp roller rolling region of the hollow output shaft and an inner circumference of the hollow drive shaft.
26. Freewheel assembly according to any of items 18 to 25, wherein the pawl seats are cylindrically shaped, are closed at one end by a wall and are open at an opposite end.
27. Freewheel assembly according to any of items 18 to 26, wherein the stair-shaped clamp body rolling region and the freewheel cage each comprise at least two receiving regions for spring elements and wherein in each case a spring element is arranged between a receiving region of the clamp body rolling region and a receiving region of the freewheeling cage.
28. Freewheel assembly according to any of items 18 to 27, wherein the pedal shaft comprises a force sensor unit, wherein the force sensor unit comprises a load cell and a pedal shaft ball bearing, wherein the load cell is arranged on the pedal shaft ball bearing.
29. Freewheel assembly according to item 28, wherein the load cell comprises an inner annular portion which is attached via fastening lugs to an outer annular portion, wherein the pedal shaft ball bearing is inserted into the inner annular portion.
30. Freewheel assembly according to item 29, wherein the inner portion and the outer portion of the load cell are radially offset to each other, wherein the fastening lugs are laterally bounded by radial slots, and wherein at least two of the fastening lugs comprise a strain gauge.
31. Freewheel assembly according to item 29 or item 30, wherein an axial thickness of the outer ring is reduced in the region of the fastening lugs.
32. Pedal shaft for a freewheel assembly, wherein the pedal shaft comprises a first fastening region for a pedal crank at a first end and a second fastening region for a pedal crank at a second end opposite thereto, and wherein the pedal shaft comprises a star-shaped receiving region for pawls in the vicinity of the first end.
33. Pedal shaft according to item 32, wherein the star-shaped receiving region comprises steps, wherein the steps each comprise a first side surface, a second side surface, a pawl support region inclined in a predefined direction relative to the circumferential direction and comprising a spring seat, an upper surface essentially parallel to the circumference, and an end region with a pawl seat, wherein the pawl seat is cylindrically shaped, axially open to one side and closed to an axially opposite side.
34. Harmonic pin ring transmission having an input shaft and an output shaft, the transmission comprising:
    a first outer gear, an inner gear concentrically disposed with respect to the first outer gear in a first axial plane, a second outer gear arranged in a second axial plane,
    a traction mechanism extending between the first outer gear and the inner gear,
    a revolving transmitter which lifts the traction mechanism from an outer circumference of the inner gear and presses it against an inner circumference of the first outer gear, wherein the transmitter comprises a hollow drive shaft and a cam disk, wherein the cam disk is disposed in a third axial plane located between the first axial plane and the second axial plane,
    and comprising a hollow output shaft which is mounted in the inner gear via a motor freewheel, and a pedal shaft, which is mounted in the hollow output shaft via a pedal shaft freewheel, wherein the pedal shaft comprises a receiving region for the motor freewheel on an outer circumference and comprises a receiving region for the pedal shaft freewheel on an inner circumference.
35. Harmonic pin ring transmission according to item 34, wherein the motor freewheel is configured as a clamp roller freewheel and the pedal shaft freewheel is configured as a pawl freewheel.
36. Harmonic pin ring transmission according to item 34 or item 35,
    wherein the driven shaft extends in the axial direction on the output side of the hollow drive shaft, wherein a ball bearing is arranged between the hollow output shaft and the pedal shaft, and wherein the hollow output shaft comprises a fastening region for an output element.
37. Harmonic pin ring transmission having an input shaft and an output shaft, the transmission comprising:
    a first outer gear, an inner gear concentrically disposed with respect to the first outer gear in a first axial plane, a second outer gear arranged in a second axial plane,
    a pin ring with pins extending between the first outer gear and the inner gear,
    a revolving transmitter which lifts the pins of the pin ring from an outer circumference of the inner gear and presses them against an inner circumference of the first outer gear, wherein the transmitter comprises a hollow drive shaft and a cam disk, wherein the cam disk is disposed in a third axial plane located between the first axial plane and the second axial plane, and wherein the pin ring is formed in one piece and is made of metal, wherein the pins are formed by projections which protrude from two opposite sides of a central region of the pin ring, wherein the central region comprises an inner bearing surface for resting on a bearing.

38. Harmonic pin ring transmission according to item 37, wherein the projections are cylindrical on a first side of the two opposite sides and wherein the projections are partially cylindrical on a second of the two opposite sides, wherein a cylindrically shaped region is located in the radial direction on the outside of the pin ring.

39. Harmonic pin ring transmission according to item 37, wherein the projections comprise an inner rounded engagement region and an outer rounded engagement region on a first side of the two opposite sides, and wherein the projections comprise an outer rounded engagement region on a second of the two opposite sides.

40. Harmonic pin ring transmission according to any of items 37 to 39, wherein a bearing is arranged between the cam disk and the pin ring, and wherein the pin ring comprises a shoulder on an inner side for supporting the bearing.

41. Pin ring for a harmonic pin ring transmission which is formed in one piece and is made of metal, wherein the pin ring comprises pins formed by projections protruding from two opposite sides of a central region of the pin ring, wherein the central region comprises an inner bearing surface for resting on a bearing outer bearing surface.

42. Pin ring according to item 41, wherein the projections are cylindrical on a first side of the two opposite sides and wherein the projections are partially cylindrical on a second of the two opposite sides, wherein a cylindrically shaped region is located in the radial direction on the outside of the pin ring.

43. Pin ring according to item 41, wherein the projections comprise an inner rounded engagement region and an outer rounded engagement region on a first side of the two opposite sides, and wherein the projections comprise an outer rounded engagement region on a second of the two opposite sides.

44. Pin ring according to item 41, wherein a web is located in each case between the projections on the first side of the opposite two sides, wherein an outer boundary line of the projections smoothly merges into an outer boundary line of the web.

45. Harmonic pin ring transmission according to any of items 41 to 44, wherein a bearing is arranged between the cam disk and the pin ring, and wherein the pin ring comprises a shoulder on an inner side for supporting the bearing.

46. Harmonic pin ring transmission having an input shaft and an output shaft, the transmission comprising:

a first outer gear, an inner gear concentrically disposed with respect to the first outer gear in a first axial plane, a second outer gear arranged in a second axial plane, a traction mechanism extending between the first outer gear and the inner gear, 47. Harmonic pin ring transmission according to item 46, wherein the load cell comprises an inner annular portion which is attached via fastening lugs to an outer annular portion, wherein the pedal shaft ball bearing is inserted into the inner annular portion and wherein the outer annular portion is inserted into a cylindrical region of the motor housing.

48. Harmonic pin ring transmission according to any of items 46 to 47, wherein a wave spring is arranged between the load cell and the drive side rotor ball bearing.

49. Harmonic pin ring transmission having an input shaft and an output shaft, the transmission comprising:

a first outer gear, an inner gear concentrically disposed with respect to the first outer gear in a first axial plane, a second outer gear arranged in a second axial plane, a traction mechanism extending between the first outer gear and the inner gear, a revolving transmitter which lifts the traction mechanism from an outer circumference of the inner gear and presses it against an inner circumference of the first outer gear, wherein the transmitter comprises a hollow drive shaft and a cam disk, wherein the cam disk is disposed in a third axial plane located between the first axial plane and the second axial plane, wherein a pedal shaft is disposed radially inside the output shaft and wherein further a planetary gear and a pedal shaft freewheel are arranged in the flow of forces between the pedal shaft and the output shaft.

50. Harmonic pin ring transmission according to item 49, wherein a planet carrier of the planetary gear is connected to the pedal shaft, a ring gear of the planetary gear comprises a connection region for connection to a transmission housing, a sun gear of the planetary gear is mounted on the pedal shaft and wherein the pedal shaft freewheel is disposed between a hollow shaft connected to the sun gear and the output shaft.

51. Harmonic pin ring transmission according to item 49, wherein the pedal shaft freewheel is arranged between the crankshaft and a planet carrier of the planetary gear, wherein a ring gear of the planetary gear is rotatably mounted in the harmonic transmission and wherein a sun gear of the planetary gear is adapted for attachment to a stationary housing part.

52. Tension shaft transmission, the tension shaft transmission comprising:

an outer gear with an internal toothing, wherein the outer gear comprises a fastening region for attachment to a transmission housing, a tensioning shaft having an external toothing, wherein the tensioning shaft is concentrically disposed with respect to the outer gear in an axial plane, a revolving transmitter which presses the tensioning shaft against the internal toothing of the outer gear, wherein the transmitter comprises a hollow drive shaft and a cam disk, wherein a ball bearing is arranged on a circumference of the cam disk, wherein a cross section of the tooth crests of the external toothing of the tensioning shaft corresponds essentially to a sector of a circle and wherein, with respect to an axis of the outer gear, the internal toothing of the outer gear is essentially defined by an outer equidistant to the gear trajectory defined by the formulas x(t)=r1*cos t(t)+r2*cos((n+1)*t)+r3*cos((n+3)*t) and y(t)=r1*sin(t)−r2*sin((n+1)*t)+r3*sin((n+3)*t), wherein n+1 is the number of teeth of the internal toothing of the outer gear, wherein the radii r1, r2 and r3 are greater than zero, and wherein for the scale of the radii r2>r3 and r1>r2+r3 applies.

53. Tension shaft transmission according to item 52, wherein the tensioning shaft is formed in a cup shape, wherein at the bottom of the cup shape, a fastening region is formed for fastening a driven shaft.

54. Tension shaft transmission according to item 53, wherein a central circular opening is formed at the bottom of the cup shape and wherein the fastening region of the tensioning shaft comprises fastening holes arranged around the central circular opening.

55. Tension shaft transmission according to item 52, wherein the tensioning shaft has the shape of a circular cylinder, and wherein comprises a second outer gear which comprises a fastening region for fastening a driven shaft, wherein the internal toothing of the outer gear is determined by the same construction as the internal toothing of the first outer gear.

56. Tension shaft transmission, the tension shaft transmission comprising:

an outer gear with an internal toothing, wherein the outer gear comprises a fastening region for attachment to a transmission housing, a tensioning shaft having an external toothing, wherein the tensioning shaft is concentrically disposed with respect to the outer gear in an axial plane, wherein a cross section of the tooth crests of the external toothing of the tensioning shaft corresponds essentially to a sector of a circle, a revolving transmitter which presses the tensioning shaft against the internal toothing of the outer gear, wherein the transmitter comprises a hollow drive shaft and a cam disk, wherein the tooth surface of the internal toothing of the outer gear is determined by a radial distance from a central axis of the inner gear as a function of a cycle angle, wherein the radial distance from the central axis is in turn determined by an inner equidistant to a gear trajectory, wherein a location on the gear trajectory is respectively determined by the vector sum of a cycle vector, a first epicycle vector and a second epicycle vector, wherein a tail of the cycle vector lies on the central axis, a tail of the first epicycle vector lies in the tip of the cycle vector, and a tail of the second epicycle vector lies in the tip of the first epicycle vector, and wherein an epicycle angle of the first epicycle vector is (n+1) times as large as the cycle angle and an epicycle angle of the second epicycle vector is (n+3) times as large as the cycle angle, wherein n is a number of pins of the harmonic pin ring transmission which is at least four, and wherein a length of the cycle vector is greater than the sum of the lengths of the first epicycle vector and the second epicycle vector, and a length of the first epicycle vector is greater than a length of the second epicycle vector.

57. Two-stage reduction gear, the two-stage reduction gear comprising:

a stationary outer gear with a first internal toothing, wherein the outer gear comprises a fastening region for attachment to a transmission housing, a rotatable outer gear with a second internal toothing, wherein the outer gear comprises a fastening region for attachment to a driven shaft, a two-part one-piece pin ring, wherein the two-part one-piece pin ring comprises a first external toothing and a second external toothing, wherein the first external toothing of the two-part one-piece pin ring engages in the internal toothing of the stationary outer gear and wherein the second external toothing of the two-part one-piece pin ring engages in the internal toothing of the rotatable outer gear, a revolving transmitter which presses the two-part one-piece pin ring against the internal toothing of the stationary outer gear and against the internal toothing of the rotatable outer gear.

58. Two-stage reduction gear according to item 57, wherein the number of teeth of the internal toothing of the stationary outer gear is greater than the number of teeth of the first external toothing, and the number of teeth of the internal toothing of the rotatable outer gear is greater than the number of teeth of the second external toothing, and wherein the number of teeth of the stationary outer gear is greater than the number of teeth of the rotatable outer gear and the number of teeth of the first external toothing is greater than the number of teeth of the second external toothing.

59. Two-stage reduction gear according to item 57 or item 58, wherein the transmitter comprises a circular ring eccentric to the axis of the stationary outer gear.

60. Two-stage reduction gear according to any of items 57 to 59, wherein a cross section of the tooth crests of the first external toothing and a cross section of the tooth crests of the second external toothing essentially correspond to a sector of a circle.

61. Two-stage reduction gear according to any of items 57 to 60, wherein a cross section of the tooth crests of the first external toothing and a cross section of the tooth crests of the second external toothing essentially correspond to an equidistant to the gear trajectory defined by the formula $x(t)=r1*\cos(t)+r2*\cos(nt)$ and $y(t)=r1*\sin(t)+r2*\sin(nt)$, wherein the following applies for the radii r1, r2: $r1>0$, $r2>0$ and $r1>r2$.

62. Two-stage reduction gear according to any of items 57 to 61, wherein a cross section of the tooth crests of the first external toothing and a cross section of the tooth crests of the second external toothing essentially correspond to an equidistant to the gear trajectory defined by the formula $x(t)=r1*\cos(t)+r2*\cos(nt)$ and $y(t)=r1*\sin(t)-r2*\sin(nt)$, wherein the following applies for the radii r1, r2: $r1>0$, $r2>0$ and $r1>r2$.

63. A load cell for determining a radial force acting on a crankshaft, the load cell comprising:

a receiving sleeve for receiving a ring of a bearing, a fastening ring for attaching the load cell in a transmission housing, axial support areas provided on the fastening ring for axially supporting the ring of the bearing, measuring regions for receiving radial forces of the receiving sleeve and which connect the receiving sleeve with the fastening ring, wherein strain sensors are attached to at least two of the measuring regions.

64. Freewheel assembly having an outer transmission freewheel and an inner pedal shaft freewheel, comprising:

a hollow drive shaft, a hollow output shaft, a pedal shaft, wherein the pedal shaft, the hollow output shaft and the hollow drive shaft are arranged concentrically with each other, the hollow output shaft is disposed radially inside the hollow drive shaft, and the pedal shaft is disposed radially inside the hollow output shaft, wherein the pedal shaft freewheel is arranged between the pedal shaft and the hollow output shaft and wherein the transmission freewheel is arranged opposite the pedal shaft freewheel on the hollow output shaft and wherein the hollow output shaft comprises adapted areas on an inner side and on an outer side in the region of the respective freewheel.

65. One-piece pin ring made of metal, wherein a pin retaining ring and an arrangement of pins which protrude in axial direction from the pin retaining ring on two opposite sides are made in one piece.
66. One-piece pin ring according to item 65, wherein the pins are connected to each other in the circumferential direction.
67. One-piece pin ring according to item 65 or 66, wherein on a first of the two opposite sides, the pins are formed as half pins, which are suitable for engaging an internal toothing, and wherein on a second of the opposite side, the pins are formed as whole pins, which are suitable for engaging in an internal toothing and for engaging in an external toothing opposite the internal toothing.
68. One-piece pin ring made of metal, wherein the one-piece pin retaining ring comprises a smooth inner circumference on an inner side and comprises rounded bulges on an outer side, which are made in one piece with the pin retaining ring.
69. One-piece pin retaining ring according to item 68, wherein at least one head region of the rounded bulges comprises a semicircular cross section.
70. Support ring assembly for a reduction gear having a first outer gear and a second outer gear comprising a support ring, a first outer gear having a first internal toothing and a second outer gear having a second internal toothing, wherein the first outer gear and the second outer gear are inserted into the support ring on opposite sides, and wherein the support ring comprises a fastening region for attachment to a transmission housing.
71. Support ring assembly according to item 70, wherein at least the first outer gear and the second outer gear are made of plastic.
72. Support ring assembly according to any of items 71 or 72, wherein the first outer gear and the second outer gear are each connected with the support wheel via a pin-groove connection.
73. One-piece rotor-transmitter element for a reduction gear comprising a hollow shaft comprising a fastening region on a first side for fastening a rotor package, and comprising a cam disk on a second side opposite to the first side, wherein an outer circumference of the cam disk is configured as a receiving area for a ball bearing.
74. One-piece rotor-transmitter element according to item 73, wherein the one-piece rotor-transmitter element is made of aluminum.
75. One-piece rotor-transmitter element according to item 73 or 74, wherein the hollow shaft is dimensioned such that a pedal shaft can be passed through the hollow shaft.
76. One-piece rotor-transmitter element according to any of items 73 to 75, wherein the cam disk comprises a circular circumference arranged eccentrically relative to the central axis of the hollow shaft.
77. One-piece rotor-transmitter element according to any of items 73 to 75, wherein the cam disk comprises an oval circumference to the central axis of the hollow shaft.
78. Drive shaft with a planetary gear arranged on the drive shaft, wherein a planet carrier of the planetary gear is fixedly connected to the drive shaft, a ring gear of the planetary gear comprises a fastening region for attachment to a transmission housing and a receiving region for a torque sensor, and a sun gear of the planetary gear is configured as a ring gear, which is arranged concentrically to the drive shaft, and wherein the sun gear is connected to a hollow output shaft of the planetary gear, which is rotatably mounted on the drive shaft.
79. Drive shaft with a planetary gear arranged on the drive shaft, wherein a planet carrier of the planetary gear is mounted on the drive shaft via a freewheel, a sun gear of the planetary gear comprises a fastening region for attachment to a transmission housing and a receiving region for a torque sensor, and a ring gear of the planetary gear comprises a receiving region for a ball bearing for supporting on a transmission housing.
80. Drive shaft with a planetary gear arranged on the drive shaft, wherein a planet carrier of the planetary gear comprises a fastening region for attachment to a transmission housing, wherein a hollow shaft of the planetary gear is fixedly connected to the drive shaft, and wherein a sun gear of the planetary gear is configured as a hollow shaft which is arranged concentrically to the drive shaft and rotatably mounted on the drive shaft.
81. Cycloidal gear, the cycloidal gear comprising the following components:
    - a transmission housing,
    - an outer gear having an internal toothing which is fixed to the transmission housing,
    - an input shaft arranged concentric with the outer gear, wherein the input shaft comprises a drive side eccentric disk, on which a first ball bearing is arranged, and an output side eccentric disk, on which a second ball bearing is arranged,
    - a drive side inner gear with an external toothing which is mounted on the first ball bearing and an output side inner gear with an external toothing which is mounted on the second ball bearing,
    - wherein the drive side inner gear and the output side inner gear are disposed inside the outer gear, and wherein the external toothings of the drive side inner gear and the output side outer gear respectively engage with the internal toothing of the outer gear.
82. Cycloidal gear according to item 81, wherein the cycloidal gear comprises a crankshaft which is mounted within the input shaft, and a load cell according to item 63 which is mounted on the crankshaft on the drive side.
83. Cycloidal gear according to any of items 81 or 82, wherein the input shaft is configured as a one-piece rotor transmitter element according to any of items 73 to 77.
84. Cycloidal gear according to any of items 81 to 83, wherein the cycloidal gear comprises a crankshaft which is mounted within the input shaft, and wherein the crankshaft comprises planetary gears according to the items 78 to 80, wherein the crankshaft forms the drive shaft of the planetary gear.
85. Cycloidal gear according to any of items 81 to 84, wherein a third ball bearing is disposed on the input shaft on the output side of the output side eccentric disk, wherein a driven pulley is arranged on the third ball bearing, wherein the driven pulley comprises carrier pins which engage in openings of the drive side inner gear and the output side inner gear, wherein an output shaft is formed radially inside on the driven pulley.

86. Cycloidal gear according to item 85, wherein an output shaft is formed radially inside on the driven pulley, wherein the third ball bearing is arranged on an inner shoulder of the output shaft and wherein an inner gear ball bearing is arranged diagonally opposite to the third ball bearing on an outer shoulder of the output shaft, wherein the inner gear ball bearing is supported on the transmission housing.

87. Cycloidal gear according to any of items 81 to 83, wherein at least one of the inner gears comprises a first toothing and a second external toothing and wherein the cycloidal gear comprises a rotatable outer gear having an internal toothing, wherein the second external toothing engages in the internal toothing of the rotatable outer gear, and wherein the rotatable outer gear comprises a fastening region for mounting a driven shaft.

That which is claimed is:

1. A transmission comprising:

an input shaft;

an output shaft;

an outer gear;

an inner gear arranged concentrically to the outer gear and inside the outer gear, a traction mechanism extending between the outer gear and the inner gear, and at least one revolving transmitter which lifts the traction mechanism from the outer circumference of the inner gear and presses it against the inner circumference of the outer gear, wherein the traction mechanism is a toothed belt comprising:

an internal toothing; and an external toothing;

wherein tooth crests of the internal toothing comprise a rounded region and wherein tooth crests of the external toothing comprise a rounded region, wherein the tooth crests of the internal toothing are arranged radially opposite the tooth bases of the external toothing so that the toothed belt comprises an offset gap arrangement in which the teeth of the internal toothing and the external toothing are offset from each other, and wherein the toothed belt comprises a smooth central bearing region.

2. The transmission according to claim 1, wherein an inner side of the toothed belt comprises a central bearing region which is provided in the form of a vertical circular cylinder, such that the internal toothing adjoins the central bearing region in axially opposite regions.

3. The transmission according to claim 1, wherein the toothed belt is made in one piece.

4. The transmission according to claim 1, wherein the toothed belt comprises plastic.

5. The transmission according to claim 1, wherein the toothed belt comprises a steel alloy.

6. The transmission according to claim 1, wherein the input shaft is connected to the transmitter.

7. The transmission according to claim 1, wherein the input shaft is connected to the outer gear.

8. The transmission according to claim 1, wherein the input shaft is connected to the inner gear.

9. The transmission according to claim 1, wherein the output shaft is connected to the inner gear.

10. The transmission according to claim 1, wherein the output shaft is connected to the transmitter.

11. The transmission according to claim 1, wherein the output shaft is connected to the outer gear.

12. A motor-transmission unit with a transmission according to claim 1, further comprising an electric motor, a rotor of the electric motor connected to the input shaft of the transmission.

13. A motor-transmission unit with a transmission according to claim 1, further comprising an internal combustion engine, an output shaft of the internal combustion engine connected to the input shaft of the transmission.

14. A vehicle comprising:

a motor-transmission unit according to claim 12, wherein at least one running wheel of the vehicle is connected to the output shaft of the transmission, and wherein the vehicle is a two-wheeler or a three-wheeler.

15. A power generator comprising:

a drive unit;

a generator unit for generating power; and a transmission according to claim 1, wherein:

an input shaft of the transmission is connected to the drive unit; and an output shaft of the transmission is connected to an input shaft of the generator.

* * * * *